United States Patent [19]
Kidby et al.

[11] Patent Number: 5,605,563
[45] Date of Patent: Feb. 25, 1997

[54] METHOD FOR REMOVING COPPER FROM AN ANION EXCHANGE MATERIAL LOADED WITH PRECIOUS METALS

[75] Inventors: Denis K. Kidby, Belwood, Canada; David M. Menne, Dalkeith, Australia

[73] Assignee: Ann Huber, Belwood, Canada

[21] Appl. No.: 448,392

[22] PCT Filed: Feb. 23, 1994

[86] PCT No.: PCT/CA94/00098

§ 371 Date: Jun. 6, 1995

§ 102(e) Date: Jun. 6, 1995

[87] PCT Pub. No.: WO94/19500

PCT Pub. Date: Sep. 1, 1994

[30] Foreign Application Priority Data

Feb. 25, 1993 [CA] Canada .................................. 2090348

[51] Int. Cl.⁶ .................................................. C22B 3/42
[52] U.S. Cl. .......................... 75/744; 210/684; 423/22; 423/24; 423/100
[58] Field of Search .......................... 75/744; 210/660, 210/681, 683, 684; 423/22, 24, 100

[56] References Cited

U.S. PATENT DOCUMENTS

| | | |
|---|---|---|
| 2,124,421 | 7/1938 | Klein . |
| 2,648,601 | 8/1953 | Byler et al. . |
| 2,753,258 | 7/1956 | Burstall et al. . |
| 2,839,389 | 6/1958 | Kember et al. . |
| 3,403,020 | 9/1968 | Lower . |
| 3,656,893 | 4/1972 | Sloan . |
| 3,788,983 | 1/1974 | Fries . |
| 3,984,314 | 10/1976 | Fries . |
| 4,267,159 | 5/1981 | Crits . |
| 4,321,145 | 3/1982 | Carlson . |
| 4,708,804 | 11/1987 | Coltrinari . |
| 4,732,609 | 3/1988 | Frey et al. .............................. 75/117 |

FOREIGN PATENT DOCUMENTS

| | | |
|---|---|---|
| 647694 | 8/1962 | Canada . |
| 783523 | 4/1968 | Canada . |

Primary Examiner—David A. Simmons
Assistant Examiner—Jerry Allen Lorengo
Attorney, Agent, or Firm—Fay, Sharpe, Beall, Fagan, Minnich & McKee

[57] ABSTRACT

The present invention, relates to the recovery of zinc values from an acidic solution containing hydrocyanic acid. The zinc is recovered as complex zinc cyanide anions which may, if desired, be recycled for the (selective) preliminary removal or separation of adsorbed copper values from an (strong or weak base) anion exchange material, the anion exchange material additionally being loaded with adsorbed cyanide complexes of precious metal values such as gold and silver. The invention, further relates to the recovery of cyanide values associated with copper cyanide complexes which are adsorbed on or taken up by an (strong or weak base) anion exchange material; the recovered cyanide values, for example, being available for recycling to a cyanide leach stage for leaching additional metal values from an ore or the like.

98 Claims, 4 Drawing Sheets

METHOD FOR REMOVING COPPER FROM AN ANION EXCHANGE MATERIAL LOADED WITH PRECIOUS METALS

The present invention generally relates to processes which exploit ion exchange materials for recovering precious metal values (e.g. gold) from an (aqueous) cyanide solution which contains impurities such as copper; in addition to copper the aqueous cyanide solution may also contain other base metal impurities such as, iron, zinc, nickel, and the like. Such a solution may, for example, be obtained from a process which involves leaching precious metal values from a metal-bearing material such as an ore, slime, concentrate, tailings and the like; in such a process the metal-bearing material is contacted with a suitable (aqueous) cyanide solution to leach metal values therefrom and obtain a cyanide leach liquor comprising complex metal cyanides, e.g. of gold, silver, copper and the like. The leach liquor may then be contacted with a suitable ion exchange material so as to adsorb metal values and obtain an exchange material loaded with a mixture of precious metals and base metals.

The present invention, in particular, relates to the treatment of an ion exchange material loaded with a mixture of cyanide complexes of precious metal values and base metal values (i.e. copper) for the separation of base metal values from the precious metal values. The present invention, by way of example only, will be particularly described hereinafter in relation to an ion exchange material obtained from a cyanide leach circuit as indicated above. The metal loaded anion exchange material may, however, come from any other (cyanide) process which produces such a metal loaded exchange material; e.g. the anion exchange material instead of being used through the entire circuit for the recovery of precious metal may be used to treat barren liquor destined for a tailings pond. The present invention, more particularly, relates to the recovery of zinc values from an acidic solution containing hydrocyanic acid. The zinc is recovered as complex zinc cyanide anions which may, if desired, be recycled for the (selective) preliminary removal Or separation of adsorbed copper values from an (strong or weak base) anion exchange material, the anion exchange material additionally being loaded with adsorbed cyanide complexes of precious metal values such as gold and silver.

The invention, further relates to the recovery of cyanide values associated with copper cyanide complexes which are adsorbed on or taken up by an (strong or weak base) anion exchange material; the recovered cyanide values, for example, being available for recycling to a cyanide leach stage for leaching additional metal values from an ore or the like.

It is known to treat a material (e.g. ore) containing precious metals such as gold and\or silver with a (dilute) alkaline aqueous solution of sodium, potassium, calcium or other similar cyanides to dissolve out or leach the gold or silver as complex cyanide ions. It is also known that the obtained (dilute) alkaline aqueous solution, (which may be in slurry or pulp form) may be contacted with an insoluble anion exchange material (e.g. with strong base and\or weak base groups) to remove the complex precious metal cyanide ions from solution. The exchange material is separated from the cyanide leach solution and the barren leach solution is either sent to a tailings pond or, if desired, recycled to leach additional precious metals from the precious metal bearing material being treated. The metal values may, for example, be recovered from an anion exchange resin by contacting the metal loaded material with a desorption agent e.g. an alkali solution (pH 13 to 14) such as for example sodium hydroxide (see U.S. Pat. No. 2,648,601, the entire contents of which is incorporated herein by reference); it is also known, for example, to recycle the treated resin whereas the extraction liquor obtained is sent to a metal recovery station wherein the precious metals may be recovered in known fashion. U.S. Pat. No. 2,839,389 suggests the use of a weakly basic anion exchange resin to remove gold or silver from aqueous cyanide solution; see also U.S. Pat. No. 3,984,314.

However, when a base metal such as copper is present in the material to be leached, the copper consumes cyanide thereby reducing the efficiency of a cyanide leach which is intended to recover precious metal from an ore, etc.; i.e. copper values are also leached in the form of complex copper cyanide anions which can travel along with the precious metal values through the exchange material treatment circuits and eventually may end up in the tailings effluent of a gold recovery process along with any free cyanide. Any copper complexes in recycled cyanide solution may also represent a fouling agent resulting in unwanted deposits being laid down in the leaching\metal recovery process circuits (see for example U.S. Pat. No. 2,124,421 the entire contents of which are incorporated herein by reference).

It has been proposed in U.S. Pat. No. 2,753,258 to recover gold adsorbed on a strongly basic anion exchange resin (e.g. Amberlite IRA-400) together with impurities such as copper by first eluting such impurities with an aqueous eluting solution comprising an alkali metal cyanide (for example sodium cyanide 1M or 2M solution) to remove copper, etc. without appreciable loss of gold from the resin. The patent suggests that if the copper content exceeds the gold content, a 2M solution of sodium cyanide is sufficient to remove (a substantial part of) the copper. The patent further suggests that if an impurity such as zinc (or nickel) is present with the gold on a strongly basic anion exchange resin a preliminary elution with a dilute aqueous mineral acid (e.g. 0.2M HCl) may serve to remove the greater part of the zinc (or nickel) without appreciable loss of gold from the resin. The patent also suggests that once the impurities are removed, the resin may be contacted with a further amount of gold bearing cyanide solution, the impurities such as copper being again selectively eluted; this cycle may be repeated a number of times to build up the amount of gold on the resin to a desired level. The entire contents of U.S. Pat. No. 2,753,258 are incorporated herein by reference.

Canadian patent no. 647,694 also suggests that an anion exchange material loaded with gold and impurity metals such as copper and nickel may be eluted with a solution of an alkali metal cyanide to elute copper and nickel in a first step and then with a mineral acid in a second step to elute further copper and nickel, the gold being eluted in a subsequent third step. The patent indicates that zinc may also be removed by the two first steps.

It is known to treat an (strong base) anionic exchange resin (e.g. Aberlite IRA-400) loaded with metal cyanide complex with a mineral acid such as sulphuric acid so as to effect destruction of metal cyanides and obtain an acidic solution comprising free metal ions and hydrocyanic acid. It is also known to use an anion exchange material (e.g. Amberlite IRA-400) having CuCN precipitated in its matrices to scavenge free cyanide from barren waste cyanide solutions; thereafter complex copper cyanide anion loaded exchange material is treated with an acid such as sulphuric acid to induce CN to dissociate from the obtained adsorbed complex copper cyanide anions leaving CuCN precipitate behind for reuse as a free cyanide scavenger; see for example, the prior art descriptions in U.S. Pat. Nos. 3,788, 983 and 3,984,314 the entire contents of both of which are incorporated herein by reference.

It is known that cyanide values may be recovered from an acidic cyanide solution containing unwanted copper, zinc and other base metal values by stripping hydrogen cyanide with air and passing the air through a suitable alkaline solution for absorbing the hydrogen cyanide in such solution (see U.S. Pat. Nos. 2,124,421 and 4,708,804); the remaining solution with any copper or zinc may be sent to a tailing pond or otherwise dealt with. The stripping\reabsorption step is a complicating factor in the overall cyanide leach process.

It has, for example, been suggested in U.S. Pat. No. 4,732,609 that a strong base or weak base anion exchange resin previously contacted with a gold mill barren solution (comprising complex metal cyanide anions) be treated with an acidic solution comprising an oxidizing agent to obtain an acidic cyanide and metal ion containing product solution. The obtained hydrogen cyanide solution is sparged with air to remove HCN and carry the HCN to an HCN absorption station where the HCN is absorbed into a caustic scrubber solution; the metal content of the hydrogen cyanide free acidic solution is removed from the system by bleeding a portion of the solution off and recovering metals therefrom by known methods such as electrowinning, precipitation and the like.

U.S. Pat. No. 4,267,159 also relates to the recovery of cyanide values from barren solutions of ore treatment processes using anion exchange materials. The patent teaches that the exchange material may be regenerated with weak and strong alkali regenerants, weak and strong regenerants being differentiated on the basis of concentration alone; i.e. NaOH may be a weak regenerant at 0.01M but a strong regenerant at 10 to 30 times this concentration.

U.S. Pat. No. 4,708,804 teaches the use of weak base anion exchange materials to adsorb complex metal cyanide anions, the metal values of which are disposed of as waste; the entire contents of this patent is incorporated herein by reference.

U.S. Pat. No. 4,321,145 relates to the use of a multilayer resin bed for the treatment of waste water containing cyanide as well as metal values (e.g. barren liquor form a cyanide gold leaching process). The patent teaches a three layer resin bed which includes a strong base anion exchange resin layer as well as weak and strong acid cation exchange resin layers. The resin bed is treated with an acid regenerant to remove metal values and form hydrocyanic acid. Hydrogen cyanide is removed from the obtained acidic effluent as a gas which is reacted with a caustic solution. The bed is then treated with an alkaline regenerant to regenerate the three layers.

U.S. Pat. No. 3,656,893 also relates to a bed comprising a cation exchange resin and a weak base anion exchange resin.

It has been suggested to displace complexes of gold and silver from a (strong base) anion exchange resin by treating the resin with a zinc complex cyanide solution (e.g. 0.1 to 0.5M zinc cyanide complex solution) whereafter the eluted resin with reduced gold content may be regenerated by treatment with a dilute acid (e.g. 1N HCl) so as to liberate hydrogen cyanide which may in turn be recovered by the stripping\adsorption technique referred to above; see U.S. Pat. No. 2,810,638.

U.S. Pat. No. 3,984,314 teaches removal of complex copper cyanide ions from a mildly alkaline solution by adsorbing the copper values onto an anionic resin followed by passing the alkaline effluent from the anionic resin through a cation exchange resin.

It has further been suggested to precipitate copper cyanide complexes from an acidic solution using a soluble sulphide such as sodium or calcium sulphide; see U.S. Pat. No. 3,403,020 and Canadian patent no. 783,523.

The prior art notwithstanding, the problem of how to deal with copper still persists in the precious metal (e.g. gold) processing arts, i.e. with respect to the manner of how to adequately and economically deal with the presence of base metals such as copper in the leaching and metal recovery circuits as well as with respect to the loss of free cyanide and cyanide values associated with copper (e.g. in tailings). A process expense is incurred to the extent that reagents such as cyanide are not able to be recycled and soluble precious metal values are locked up in tailing ponds. Accordingly the industry is continuing to search for alternate process techniques to meet this challenge.

None of the above references deals with the use of complex zinc cyanide ions as part of a preliminary treatment to remove base metal (e.g. copper) while leaving the precious metals (e.g. gold) behind on the resin nor the problem of how to recover the zinc (and if desired cyanide values associated with the copper) directly from a hydrocyanic acid containing solution without recourse to a preliminary stripping\reabsorption technique for recovering the cyanide values.

It would be advantageous to have a system, method or process whereby zinc values may be removed from an acidic solution comprising hydrocyanic acid without the necessity of first separating the hydrocyanic acid from the solution.

It would be advantageous to have a system, method or process whereby all of or part of the copper values may be removed from a copper loaded anion exchange material which is also loaded with precious metal values so that the exchange material may be recycled to a precious metal leach circuit for building up the precious metal values on the exchange material.

It would be advantageous to have a system, method or process whereby all of or part of the copper values may be partially removed from a copper loaded anion exchange material which is also loaded with precious metal values. Such an exchange material may be acid treated so as to impregnate the exchange material with CuCN and the treated exchange material may be recycled to a precious metal recovery circuit (e.g. for treating barren leach solution (containing free cyanide) destined for a tailings pond) for building up the precious metal values on the exchange material and also for scavenging free cyanide for later recovery therefrom (i.e. by combining free Cn with the CuCN to form a complex copper cyanide anion).

It would be advantageous to have a system, method or process whereby complex zinc cyanide anions may be used in a copper stripping treatment of anion exchange material loaded with copper and precious metal values.

It would be advantageous to have a system, method or process whereby an acidic solution comprising zinc cations and hydrocyanic acid (and possibly copper values, e.g. as a CuCN precipitate) may be treated so as to recover zinc values in the form of complex zinc cyanide ions which may be recycled for use in a copper stripping treatment of anion exchange material loaded with copper and precious metal values.

It would also be advantageous to have a system, method or process which is able to recover cyanide values from copper cyanide complexes, adsorbed on an (e.g. strong or weak base) anion exchange material, for reuse, as well as providing for a means for removing copper from a cyanide leach system (for the recovery of precious metal).

It would be advantageous to have a system, method or process which has the flexibility not only of being capable of being integrated into a precious metal recovery circuit which uses anion exchange resin throughout the cyanide adsorption circuit but also, if desired, as a means for the recovery of precious metal values and free cyanide values from an anion exchange resin previously contacted with cyanide barren solution (e.g. comprising copper) obtained from a metal adsorption circuit using, for example, activated carbon in the metal adsorption circuit.

SUMMARY OF INVENTION

Accordingly, the present invention in one aspect provides a method for removing zinc cations from an acidic solution comprising zinc cations and hydrocyanic acid and obtaining complex zinc cyanide anions. The method is characterized in that i) the acidic solution is subjected to a zinc removal step for removing zinc cations therefrom, the zinc removal step comprising contacting the acidic solution with a cation exchange material so as to obtain an acidic product liquor comprising hydrocyanic acid and a cation exchange material loaded with adsorbed zinc cations, and ii) so obtained cation exchange material loaded with adsorbed zinc cations is subjected to an alkaline zinc stripping treatment step for the removal of zinc values therefrom in the form of complex zinc cyanide anions.

The zinc stripping treatment step comprises contacting the cation exchange material loaded with adsorbed zinc cations, with an alkaline zinc eluting solution comprising an alkali metal cyanide so as to obtain an alkaline zinc containing product solution and a treated cation exchange material. The alkaline zinc containing product solution comprises complex zinc cyanide anions. The treated cation exchange material will, of course, have a correspondingly reduced zinc content; the zinc content of the cation exchange material need not be reduced to zero it may, as desired reflect some desired or necessary intermediate amount.

It is to be understood herein, that if a "range", "group", or the like is mentioned with respect to a particular characteristic of any aspect of the present invention, the present invention relates to and explicitly incorporates herein each and every specific member and sub-ranges or sub-groups therein whatsoever. Thus, any specified range, group or the like is to be understood as a shorthand way of referring to each and every member of a range or group individually as well as each and every possible sub-ranges or sub-groups encompassed therein. For example, with respect the pH, the mention of the range of 6 or lower is to be understood as specifically incorporating herein each and every individual pH value as well as sub-range of pH, such as for example pH 3 or less, 2.5 or less, 2.0, 1.0 to 2.5, 1.0 or less, etc..; similarly with respect to ranges for temperature, concentrations (e.g. normality, molarity, molality, etc.), and weight as well as to groups of materials such as, for example, ion exchange materials, mineral (inorganic) acids, alkali metals and compounds thereof, etc...

The zinc containing acidic solution may have any acidic pH provided that the zinc is in solution as a cation in the presence of the hydrocyanic acid (HCN). By way of example only, the solution may be an (aqueous) acidic solution which comprises a mineral acid (e.g. $H_2SO_4$, HCl, and the like) and have a Ph of 3.0 or less. The pH of the acidic solution may vary in accordance with the circumstance. For example, if the acidic solution to be treated is associated with insoluble copper values (i.e. a precipitate comprising copper and cyanide values, e.g. a precipitate of CuCN), the pH may vary from about 1.0 to about 2.5, e.g. 2.0. On the other hand, for example, if it is desired to remove (e.g. by filtration, thickening, etc..) copper cyanide values initially associated with the acidic solution (e.g. CuCN precipitate), prior to the zinc removal step, the pH of the solution may, if desired, be 1.0 or lower before effecting separation (e.g. filtration); in such case the filtrate to be fed to the zinc removal stage will have a pH of 1.0 or lower.

If the acidic solution to be treated is associated with copper, the solution to be treated as well as the conditions of zinc removal treatment must also be such as to favour the presence of copper in an insoluble rather than soluble form; e.g. no oxidizers. Thus, for example, if the acidic solution comprises sulphuric acid and is associated with copper values such as a precipitate of CuCN, the zinc removal step, is preferably carried out under conditions which exclude or limit the presence of oxidizing agent(s) so as to inhibit the formation of soluble copper values such as for example copper sulphate (e.g. to the extent practical, the process may be carried out in any suitable manner so as to exclude or minimize contact with air).

In accordance with the present invention, the cation exchange material and the acidic solution may, for example, be brought together in a column wherein the exchange material may be maintained as a fixed packed bed or preferably as an expanded or fluidized bed. A fluidized bed wherein solution passes (up) in countercurrent fashion relative to the exchange material (moving downwardly) is preferred, especially if the acid solution also includes a precipitate such as CuCN; in this latter case the take up of zinc would be analogous to the take up of metal values onto an exchange material using the known "in pulp" methods for treating precious metal bearing ore or concentrate (see for example U.S. Pat. No. 2,648,601). If the acid solution includes such copper containing precipitate particles then in order to inhibit the precipitate from plugging up the bed of exchange material, the relative velocity of the solution (up) through the column and the size and weight of the particles of exchange material may be coordinated (in known manner) such that the precipitate particles may pass through the exchange material and out of the column along with the acidic product solution; the acidic product solution may then be treated as hereinafter described to convert any entrained insoluble copper (cyanide) values to a copper sulphide precipitate so as to allow the recovery cyanide values associated with the copper.

In accordance with the present invention, a treated cation exchange material may be recycled to the zinc removal step for use as the cation exchange resin.

The zinc removal step may comprise contacting the acidic solution with a weak or strong acid cation exchange material (e.g. resin). Any cation exchange material may be used provided that it is able to take up zinc cation and thereafter release the zinc values as complex cyanide anions to an alkaline solution comprising an alkali metal cyanide. Suitable cation exchange resins are commercially available. Examples of strong acid cation exchange resins include Amberlite 200 (available from Rohm & Haas Co. Chauny, France) and Dowex MSC-1 (available from Dow Chemical Co. U.S.A.) and the like. Preferably, for example, a weak acid cation exchange resin is used; examples of such weak exchange resins include Amberlite IR 120LH (available from Rohm& Haas Co. Chauny, France) and Dowex CCR-2 (available from Dow Chemical U.S.A.) and the like.

In accordance with the present invention, the zinc loaded cation exchange material is contacted with an (aqueous) alkaline zinc eluting solution comprising an alkali metal cyanide. The alkaline zinc eluting solution may have a pH of 10 to 14 (e.g. a pH of 12) but the pH may be lower or higher depending on the nature of the cation exchange material used, the amount of zinc adsorbed on the cation exchange material, etc.. The alkali zinc eluting solution may, for example, comprise sodium cyanide (NaCN), potassium cyanide (KCN), and the like (e.g. an aqueous solution of about 2.5 to 5.0M sodium cyanide). The alkaline zinc eluting solution may if desired or necessary contain other base materials such as alkali metal hydroxide (e.,g. NaOH, KOH, etc.) or alkaline earth metal hydroxide (e.g. $Ca(OH)_2$) for pH adjustment but will usually consist of water and the alkali metal cyanide. The concentration of alkali metal cyanide in the eluting solution will of course vary in accordance with the desired final concentration of zinc complex in the alkaline zinc containing product solution, the initial amount (weight) of adsorbed zinc per unit weight of exchange material, the desired or obtainable final amount of adsorbed zinc cation remaining on the exchange material after zinc stripping, residence or contact time between the solution and exchange material, etc. If it is desired to remove all or substantially all of the zinc values from a given weight of exchange material then as a practical matter the alkali metal cyanide solution should contain an amount of CN in excess of that necessary to bind with the amount of zinc cation present on the exchange material; this will result in a product solution which contains excess free cyanide values. Desirably, if the product solution is to be used to recycle zinc complex anions to a copper stripping treatment as described below, the initial concentration of alkali metal cyanide and the contact times may be such that the product solution may be used directly (with or without possible dilution with water) in the copper stripping treatment, the product solution containing no or a minimum amount of excess free cyanide. The alkaline zinc eluting solution may, for example, depending upon the zinc content on the cation exchange material, have an alkali metal cyanide content sufficient to provide a (aqueous) zinc containing product solution comprising 0.1 to 1.0M $Zn(CN)_4^{2-}$. The alkaline eluting solution initially contacting the zinc loaded cation exchange material may, for example, be a (aqueous) solution of 1.0 to 5.0M NaCN, e.g. 2.1M NaCN.

As mentioned above, the acidic solution may be associated with a cyanide containing precipitate comprising copper values and cyanide values. If the acidic solution comprises sulphuric acid the precipitate will comprise CuCN. On the other hand, the precipitate may include other values; for example if the solution comprises HCl the precipitate may include chlorine values as well.

In accordance with the present invention, if the acidic zinc cation containing solution is associated with a cyanide containing precipitate then, alternatively, if desired, before being subjected to said zinc removal step, the solution may be subjected to a precipitate recovery step for separating cyanide containing precipitate therefrom.

A cyanide precipitate containing copper and cyanide values may be treated in any (known or conventional) manner so as to recover cyanide values therefrom. Thus, for example, a precipitate comprising copper and cyanide values may be subjected to a copper precipitate conversion treatment. The copper precipitate conversion treatment may comprise contacting (in known manner) an aqueous mixture with a soluble sulphide so as to obtain a copper sulphide containing precipitate and a treated liquor; the aqueous mixture will have an appropriate pH (e.g. a pH of from about 4 to about 6, especially about 5) and may comprise water and cyanide containing precipitate. The aqueous mixture may be obtained by mixing the precipitate with water and adjusting the pH as necessary. The copper containing precipitate may comprise a copper sulphide such as cuprous sulphide. The treated liquor on the other hand will comprise (soluble) cyanide values which may, as desired, be recycled for reuse in other parts of a precious metal recovery system after the treated mixture is subjected to a precipitate separation step for recovering treated liquor from the treated mixture. The soluble sulphide may for example comprise an alkali metal sulphide such as $Na_2S$, $K_2S$, and the like. Preferably, the precipitation process is conducted such that there will be substantially no excess sulphide in solution at the end of the precipitation treatment; for example, $9.466\times10^{-3}$ moles $Na_2S$ may be admixed with a liter of solution containing 1208 ppm Cu so as to obtain a solution containing 5 ppm Cu. After precipitation the treated liquor may if desired be recycled.

In accordance with another aspect of the present invention, an (weak or strong) alkaline solution comprising complex zinc cyanide anions may be used to strip copper values from an anion exchange material loaded with adsorbed complex copper cyanide anions and complex precious metal ions. A treated anion exchange material loaded with precious metal values and with reduced copper values may, for example, be recycled to a primary precious metal leach circuit or to a cyanide barren solution treatment station to build up the precious metal values on the exchange material to the desired levels. During the repeated copper stripping treatments, it is not necessary to remove all or substantially all of the copper from the anion exchange material. The anion exchange material may be contacted with an amount of complex zinc cyanide which is less than the amount necessary to remove all of the copper from the exchange material. In such case the product eluent may be essentially free of soluble zinc values and therefore may proceed directly to a copper recovery station wherein the copper may be precipitated (in known manner as CuS, CuCN and the like) so as to provide a solution comprising hydrocyanic acid; precipitation may, for example, be induced (in known manner) by acidification followed by admixing with a suitable soluble alkali metal sulphide to obtain a copper sulphide precipitate as mentioned above.

However, notwithstanding the precautions that may be taken so as to avoid break through of complex zinc cyanide anions into the product effluent form the copper stripping station, in practice some zinc values from the initial copper eluting solution may find their way into the product eluent. Additionally, (e.g. prior to recovery of the gold, silver, etc.), it may be desired to remove all or substantially all of the copper for the exchange material. In such case the exchange material may be treated with an excess of complex zinc cyanide anions sufficient to displace all of the displaceable copper values (and possibly if desired some precious metal) into the product eluent such that the product eluent may comprise in addition to complex copper cyanide anions, excess complex zinc Cyanide anions (and possibly precious metal values). In this latter case, it would be advantageous to be able to separate the zinc values from copper values such that zinc values may be recycled e.g. as complex zinc cyanide anions.

Thus, in accordance with another aspect, the present invention, provides a method for removing copper values from an anion exchange material loaded with initial copper and precious metal values, the method exploiting the above described method for recovering zinc values from an acidic solution comprising hydrocyanic acid. The method for removing copper values comprises i) subjecting an anion exchange material loaded with adsorbed complex copper cyanide anions and adsorbed complex precious metal cyanide anions, to a copper stripping treatment step for removing copper values therefrom, the copper stripping treatment step comprising contacting the anion exchange material with an alkaline copper eluting solution comprising zinc complex cyanide ions so as to obtain an alkaline eluate comprising complex copper cyanide anions and complex zinc cyanide anions and a treated zinc loaded anion exchange material loaded with precious metal values and complex zinc cyanide anions, ii) admixing an acidification agent with so obtained alkaline eluate so as to obtain a mixture comprising an acidic product solution and a cyanide containing precipitate, the acidic product solution comprising zinc cations and hydrocyanic acid, the cyanide containing precipitate comprising copper values and cyanide values, iii) subjecting so obtained acidic product solution to a zinc removal step for removing zinc cations therefrom, the zinc removal step comprising contacting the acidic product solution with a cation exchange material so as to obtain an acidic product liquor comprising hydrocyanic acid and a cation exchange material loaded with adsorbed zinc cations, iv) subjecting so obtained cation exchange material loaded with adsorbed zinc cations to an alkaline zinc stripping treatment step for removing zinc values therefrom, the alkaline zinc stripping treatment step comprising contacting cation exchange material loaded with adsorbed zinc cations, with an alkaline zinc eluting solution comprising an alkali metal cyanide so as to obtain an alkaline zinc containing product solution and a treated cation exchange material, the alkaline zinc containing product solution comprising complex zinc cyanide anions, and v) recycling so obtained treated cation exchange material to the zinc removal step.

The complex zinc cyanide anions of the zinc containing product solution may be recycled to the copper stripping treatment, e.g. after any necessary or desired concentration adjustment with respect to the complex zinc cyanide anions.. The zinc containing product solution may, for example, if desired, itself be recycled to the copper stripping treatment step, provided that the solution has the desired concentration of complex zinc cyanide anions.

Any weak or strong base anion exchange material (e.g. resin) may be treated provided that it is able to take up metal values as complex metal cyanide anions and thereafter release the copper values as complex cyanide anions to an alkaline copper eluting solution comprising complex zinc cyanide anions. Suitable anion exchange resins are commercially available. Preferably, for example, a strong base anion exchange resin is used; examples of such strong base exchange resins include Duolite A161 L (available from Rohm & Haas Co. Chauny, France) and Dowex MSA-1 (available from Dow Chemical Co. U.S.A. and the like. Examples of weak base anion exchange resins include Duolite A365 (available from Rohm & Hass Co.) and Dowex MWA-1 (available from Dow Chemical Co. U.S.A.) and the like.

The concentration of complex zinc cyanide anions, in the alkaline copper eluting solution, may have any suitable value provided that copper is eluted from the anion exchange material and zinc values take its place on the anion exchange material. The alkaline copper eluting solution may, for example, have a complex zinc cyanide anion concentration such that substantially all of the initial precious metal values remain on the treated zinc loaded anion exchange material. Alternatively, if desired, the alkaline copper eluting solution may have a complex zinc cyanide anion concentration such that some of the initial precious metal values also pass into the alkaline eluate. The latter case may for example, be desired, if the anion exchange material is being used only to treat the cyanide barren solution of a precious metal recovery system; eluted precious metal (e.g. gold) may be passed back to the main precious metal leach circuit in recycled treated liquor containing recovered cyanide values. The alkaline copper eluting solution comprising complex zinc cyanide anions may be thus be a weak or strong alkaline copper eluting solution depending on whether or not it is desired to inhibit the removal of precious metal along with the copper or to facilitate such removal. As used herein a weak solution is a relatively dilute or lower strength solution (e.g. 0.1M $Zn(CN)_4^{2-}$) and a strong solution is a relatively more concentrated or higher strength solution (e.g. 0.5M $Zn(CN)_4^{2-}$). The acidification agent which is admixed with the alkaline eluate so as to obtain the mixture comprising the acidic product solution and the cyanide containing precipitate, may comprise any substance(s) which can bring about the desired pH change to an acidic solution so as to induce CN to dissociate from cyanide complexes (e.g. for CN to dissociate from zinc cyanide complex) subject to the above discussed precaution to exclude oxidizing agents. Thus, the pH of the alkaline eluate may be adjusted to pH 3 or less under conditions which favour the formation of a cyanide containing precipitate (i.e. under conditions such as mentioned above which inhibit the formation of soluble copper values). The acidification agent may, for example, comprise a mineral (inorganic) acid such as for example sulfuric acid, hydrochloric acid and the like. The acid solution may be fresh acid or be constituted by a recycled acid solution from another part of the metal recovery system.

Copper values may be recovered as a copper cyanide (CuCN) precipitate or as another precipitate such as a copper sulphide (e.g. $Cu_2S$) precipitate before or after a zinc cation ($Zn^{2+}$) containing solution is subjected to the zinc removal step.

If the cyanide containing precipitate is to be removed (e.g. by filtration) from the acidified alkaline eluate prior to the removal of zinc cations therefrom, the pH of the alkaline eluate may be adjusted to for example 1.0 or less; on the other hand if the cyanide containing precipitate is to be dealt with after the removal of zinc cations from the acidified alkaline eluate the pH may be adjusted to, for example, a pH of about 1.0 to about 2.5, (e.g. a pH of 2.0).

In accordance with the present invention, the obtained acidic product solution, before being subjected to the zinc removal step may be subjected to a precipitate recovery step for separating cyanide containing precipitate therefrom. The obtained separated cyanide containing precipitate may, if desired be subjected to the above described copper precipitate conversion treatment.

Alternatively, the mixture obtained from the acidification step may be passed directly to the zinc removal step to obtain a product mixture comprising the acidic liquor and the cyanide containing precipitate. Instead of separating the acidic product liquor and the cyanide containing precipitate the product mixture may have its pH adjusted to the appropriate value for carrying out the above described copper precipitate conversion treatment wherein the obtained pH adjusted mixture is contacted with a soluble sulphide so as to obtain a treated mixture comprising a treated liquor and a cuprous sulphide containing precipitate.

A treated liquor comprising cyanide values (and possibly precious metal values) may have its pH adjusted to a desired alkaline value (e.g. a pH of about 9 to 11 or higher) by the addition of an appropriate base such as $Ca(OH)_2$, NaOH, and the like and be recycled to a precious metal leach circuit to elute metal values from ore, slime and the like.

In accordance with the present invention, an anion exchange material loaded with zinc values, contributed by an alkaline copper eluting solution or otherwise, may be subjected to an acid zinc stripping treatment to remove zinc values therefrom; e.g. so that the exchange material with all or substantially all of the zinc values removed therefrom may, if desired, be recycled to the primary precious metal leach circuit to pick up additional precious metal values. The removed zinc values in an obtained acidic product eluate may be recovered in the form of complex zinc cyanide anions.

Thus, in accordance with another aspect, the present invention provides a method for recovering complex zinc cyanide anions from an anion exchange material, the anion exchange material being loaded with initial zinc and precious metal values, said method comprising i) subjecting an anion exchange material loaded with adsorbed complex zinc cyanide anions and adsorbed complex precious metal cyanide anions, to an acid zinc stripping treatment step for removing zinc values therefrom, said acid zinc stripping treatment. step comprising contacting said anion exchange material with an acidic zinc eluting solution so as to obtain an acidic product eluate comprising zinc cations and hydrocyanic acid and an acid treated anion exchange material loaded with precious metal values, ii) subjecting a so obtained acidic product eluate to a zinc removal step for removing zinc cations therefrom, said zinc removal step comprising contacting the acidic product solution with a cation exchange material so as to obtain a cation exchange material loaded with adsorbed zinc cations and an acidic product liquor comprising hydrocyanic acid, and iii) subjecting a so obtained cation exchange material loaded with adsorbed zinc cations to an alkaline zinc stripping treatment step for removing zinc values therefrom, said alkaline zinc stripping treatment step comprising contacting said cation exchange material loaded with adsorbed zinc cations, with an alkaline zinc eluting solution comprising an alkali metal cyanide so as to obtain an alkaline zinc containing product solution and a treated cation exchange material, said alkaline zinc containing product solution comprising complex zinc cyanide anions.

The acid zinc stripping treatment step may comprise contacting the anion exchange material with an acidic zinc eluting solution comprising a mineral acid (for example, sulfuric acid, hydrochloric acid and the like) so as to obtain an acidic product eluate comprising zinc cations and hydrocyanic acid and an acid treated anion exchange material loaded with precious metal values.

The acid concentration or strength of the acid zinc eluting solution, may have any suitable value provided that zinc is eluted from the anion exchange material. The acid zinc eluting solution may, for example, have a strength such that substantially all of the initial precious metal values remain on the treated zinc loaded anion exchange material. Alternatively, if desired, the acid zinc eluting solution may have a strength such that some of precious metal values also pass into the acid eluate. The acid zinc eluting solution may be thus be a weak or strong eluting solution depending on whether or not it is desired to inhibit the removal of precious metal along with the zinc or to facilitate such removal. As used herein a weak solution is a relatively dilute or lower strength solution (e.g. 0.9N to 3.6N $H_2SO_4$, 0.9N to 3.6N HCl, etc.) and a strong solution is a relatively more concentrated or higher strength solution (e.g. higher than 3.6N).

An acidic eluting solution in any event has a pH (e.g. a pH of about 1 or lower) sufficient to induce CN to dissociate from complex cyanides so as to provide an acidic eluate comprising hydrocyanic acid and zinc cations; the elution conditions being such as to inhibit formation of soluble copper values (e.g. inhibit the formation of copper sulphate); see prior comments in this regard.

In accordance with the present invention, the anion exchange material loaded with adsorbed complex zinc cyanide anions and adsorbed complex precious metal cyanide anions may also be loaded with complex copper cyanide anions. In this case, the anion exchange material loaded with adsorbed complex copper cyanide anions may be subjected to the acid zinc stripping treatment such that the obtained acid treated anion exchange material is impregnated with CuCN; see for example U.S. Pat. No. 3,788,983. The so obtained CuCN impregnated anion exchange material may be recycled to treat cyanide barren solution to pick up residual precious metal values and also to scavenge any free cyanide (the free cyanide is taken up by CuCN so as to form a complex copper cyanide anion).

The acidic product eluate (e.g. having a pH of about 1 or lower) from the acid stripping stage may be associated with a cyanide containing precipitate mentioned above, i.e. a precipitate comprising copper and cyanide values. This type of precipitate may as mentioned above be dealt with before or after the zinc removal step, e.g. CuCN may be recovered or be converted to cuprous sulphide.

As previously mentioned, the treated cation exchange material may advantageously be recycled to the zinc recovery step for (re)use as the acid cation exchange material.

In accordance a particular aspect, the present invention provides for the removal of copper values from an anion exchange material using an alkaline copper eluting solution comprising complex zinc cyanide anions as well as for the recovery of complex zinc cyanide anions.

Thus, in accordance with a further aspect the present invention provides a method for removing copper values from an anion exchange material, said anion exchange material being loaded with initial copper and precious metal values, said method comprising i) subjecting an anion exchange material loaded with adsorbed complex copper cyanide anions and adsorbed complex precious metal cyanide anions, to a copper stripping treatment step for removing copper values therefrom, said copper stripping treatment step comprising contacting said anion exchange material loaded with adsorbed complex copper cyanide anions and adsorbed complex precious metal cyanide anions, with an alkaline copper eluting solution comprising zinc complex cyanide ions so as to obtain an alkaline first eluate comprising complex copper cyanide anions and an alkaline treated zinc loaded anion exchange material loaded with adsorbed complex zinc cyanide anions and precious metal values, ii) subjecting so obtained alkaline treated zinc loaded anion exchange material to an acid zinc stripping treatment step for removing zinc values therefrom, said acid zinc stripping treatment step comprising contacting the alkaline treated zinc loaded anion exchange material with an acidic zinc eluting solution so as to obtain an acidic product eluate comprising zinc cations and hydrocyanic acid and an acid treated anion exchange material loaded with precious metal values, iii) subjecting so obtained acidic product eluate to a zinc removal step for removing zinc cations therefrom, said zinc removal step comprising contacting the acidic product eluate with a cation exchange material so as to obtain a cation exchange material loaded with adsorbed zinc cations and an acidic product liquor comprising hydrocyanic acid, iv) subjecting so obtained cation exchange material loaded with zinc cations to an alkaline zinc stripping step for removing zinc values therefrom, said alkaline zinc stripping step comprising contacting said cation exchange material loaded with zinc cations, with an alkaline zinc eluting solution comprising an alkali metal cyanide so as to obtain an alkaline zinc containing product solution and a treated cation exchange material, said alkaline zinc containing product solution comprising complex zinc cyanide anions, v) recycling complex zinc cyanide anions of said alkaline zinc containing product solution to said copper stripping treatment step, and vi) recycling so obtained treated cation exchange material to said zinc removal step.

In accordance with the present invention the copper eluting stage may, as mentioned above, be carried out so as to obtain an alkaline treated zinc loaded anion exchange material loaded with substantially all of the initial precious metal values. Similarly, the acid zinc stripping stage may as mentioned above be carried out so as to obtain an acid treated anion exchange material loaded with substantially all of the precious metal values loaded on the alkaline treated zinc loaded anion exchange material.

With respect to the copper stripping stage, acid zinc stripping stage, zinc removal stage etc.; see the previous comments with respect thereto.

In accordance with the present invention, the copper stripping treatment step may (as desired) only remove a portion of the initial copper values from an anion exchange material loaded with adsorbed complex copper cyanide anions such that the obtained alkaline treated zinc loaded anion exchange material is loaded with adsorbed complex copper cyanide anions. A so obtained alkaline treated zinc loaded anion exchange material loaded with complex copper cyanide anions may be subjected to an acid zinc stripping treatment such that the obtained acid treated anion exchange material is impregnated with CuCN; see previous comments with respect to this impregnation.

As mentioned above, if a solution comprises copper and zinc values the solution may be treated so as to remove the copper as a precipitate.

Thus in accordance with a particular aspect of the present invention, when the alkaline first eluate comprises complex copper cyanide anions and complex zinc cyanide anions, a method of the present invention may be characterized in that an acidification agent is admixed with the alkaline first eluate so as to obtain a first mixture comprising an acidic first solution and a cyanide containing precipitate, the acidic first solution comprising zinc cations and hydrocyanic acid, the cyanide containing precipitate comprising copper values and cyanide values, so obtained acidic first solution is subjected to a zinc removal step for removing zinc cations therefrom, the zinc removal step comprising contacting the acidic first eluent solution, with a cation exchange material so as to obtain a cation exchange material loaded with adsorbed zinc cations and an acidic product liquor comprising hydrocyanic acid, a so obtained cation exchange material loaded with adsorbed zinc cations is subjected to an alkaline zinc stripping step for removing zinc values therefrom, the alkaline zinc stripping step comprising contacting the cation exchange material loaded with adsorbed zinc cations, with an alkaline zinc eluting solution comprising an alkali metal cyanide so as to obtain an alkaline zinc containing product solution and a treated cation exchange material, the alkaline zinc containing product solution comprising complex zinc cyanide anions, complex zinc cyanide anions of the alkaline zinc containing product solution are recycled to the copper stripping treatment step, and so obtained treated cation exchange material is recycled to the zinc removal step.

Additionally, in accordance with another particular aspect of the present invention, when the alkaline first eluate comprises complex copper cyanide anions and complex zinc cyanide anions, a method of the present invention may be characterized in that an acidification agent is admixed with a said so obtained alkaline first eluate so as to obtain a first mixture comprising an acidic first solution and a cyanide containing precipitate, said acidic first solution comprising zinc cations and hydrocyanic acid, said cyanide containing precipitate comprising copper values and cyanide values, a so obtained first mixture is commingled with acidic product eluate to obtain a commingled acidic mixture comprising an acidic mixed solution and cyanide containing precipitate, and a so obtained acidic mixed solution is subjected to said zinc recovery step so as to obtain a cation exchange material loaded with zinc cations and said acidic product liquor.

With respect to the copper stripping stage, acid zinc stripping stage, zinc removal stage, copper sulphide precipitation, etc., see the previous comments with respect thereto.

In accordance with the present invention, if desired or necessary a portion of the anion exchange resin may be subjected to the copper stripping treatment and an acid elution treatment while the other portion may be subjected only to the acid elution treatment; the proportion of exchange material being directed to the two streams being varied as desired in response to necessity or a desire to provide acid treated exchange material able to scavenge free cyanide from solution as well as in response to the amount of base metal (e.g. copper, zinc, iron, etc.) adsorbed on the anion exchange material to be treated; i.e. if the initial copper content is low the amount of exchange material being sent directly to the acid zinc strip may be higher than if the initial copper content is relatively high.

Thus, in accordance with another aspect the present invention provides a method for recovering copper values and cyanide values from an anion exchange material, the anion exchange material being loaded with initial copper and precious metal values, the method comprising i) providing a first amount of an anion exchange material loaded with adsorbed complex copper cyanide anions and adsorbed complex precious metal cyanide anions and a second amount of an anion exchange material loaded with adsorbed complex copper cyanide anions and adsorbed complex precious metal cyanide anions, ii) subjecting the first amount to a copper stripping treatment step for removing copper values therefrom, the copper stripping treatment step comprising contacting the first amount with an alkaline zinc eluting solution comprising zinc complex cyanide ions so as to obtain an alkaline first eluate comprising complex copper cyanide anions and a treated first amount of anion exchange material loaded with complex zinc cyanide anions and precious metal values, iii) comingling the treated first amount and the second amount to provide a commingled anion exchange material, iv) subjecting the commingled anion exchange material to an acid zinc stripping treatment step for removing zinc values therefrom, the acid zinc treatment step comprising contacting the commingled anion exchange material with an acidic zinc eluting solution so as to obtain an acidic product eluate and an acid treated exchange material, the acidic product eluate comprising zinc cations and hydrocyanic acid, the acid treated anion exchange material comprising precious metal values and being impregnated with CuCN, v) subjecting so obtained acidic product eluate to a zinc removal step for removing zinc cations therefrom, the zinc removal step comprising contacting the commingled acidic mixed solution with a cation exchange material to remove zinc cations therefrom so as to obtain a cation exchange material loaded with adsorbed zinc cations and an acidic product liquor comprising soluble copper values and hydrocyanic acid, vi) subjecting so obtained cation exchange material loaded with adsorbed zinc cations to an alkaline zinc stripping treatment step for removing zinc values therefrom, the alkaline zinc stripping treatment step comprising contacting the cation exchange material loaded with adsorbed zinc cations, with an alkaline zinc eluting solution comprising an alkali metal cyanide so as to obtain a zinc containing product solution and a treated cation exchange material, the alkaline zinc containing product solution comprising complex zinc cyanide anions, vii) recycling complex zinc cyanide anions of the alkaline zinc containing product solution to the copper stripping treatment step, and viii) recycling a so obtained treated cation exchange material to the zinc recovery step.

With respect to the copper stripping stage, acid zinc stripping stage, zinc removal stage, copper sulphide precipitation, etc., see the previous comments with respect thereto.

In accordance with the present invention the acidification agent may in a particular comprise a mineral acid such as sulphuric acid (e.g. an aqueous solution of about 2.0 to 5.0N sulphuric acid).

In accordance with the present invention, The concentration of the zinc cyanide complex in the alkaline zinc eluting solution may be lower than that required to remove substantial amounts of gold and\or silver, and the like from the strong base anion exchange material (e.g. about 0.1 to 0.3M). The concentration of the alkaline zinc eluting solution will depend on the nature of the exchange material, the amount of copper present, the amount of gold present, etc, and may vary accordingly.

In accordance with the present invention the soluble sulphide may comprise an alkali metal sulphide such as sodium sulphide (e.g. an aqueous solution of about 2.0 to 3.5M of such sulphide).

An insoluble material (e.g. ion exchange material) in accordance with the present invention is to be understood as characterizing the material as being insoluble in the fluids (e.g. liquids) with which it is intended to come into contact such as water, (dilute) acids (e.g. sulphuric acid), (dilute) bases (e.g. NaOH, NaCN, KCN, CaCN, etc.); the ion exchange material being capable of being regenerated with an acid\base solution.

In drawings which illustrate example embodiments of the present invention,

Figure 1:
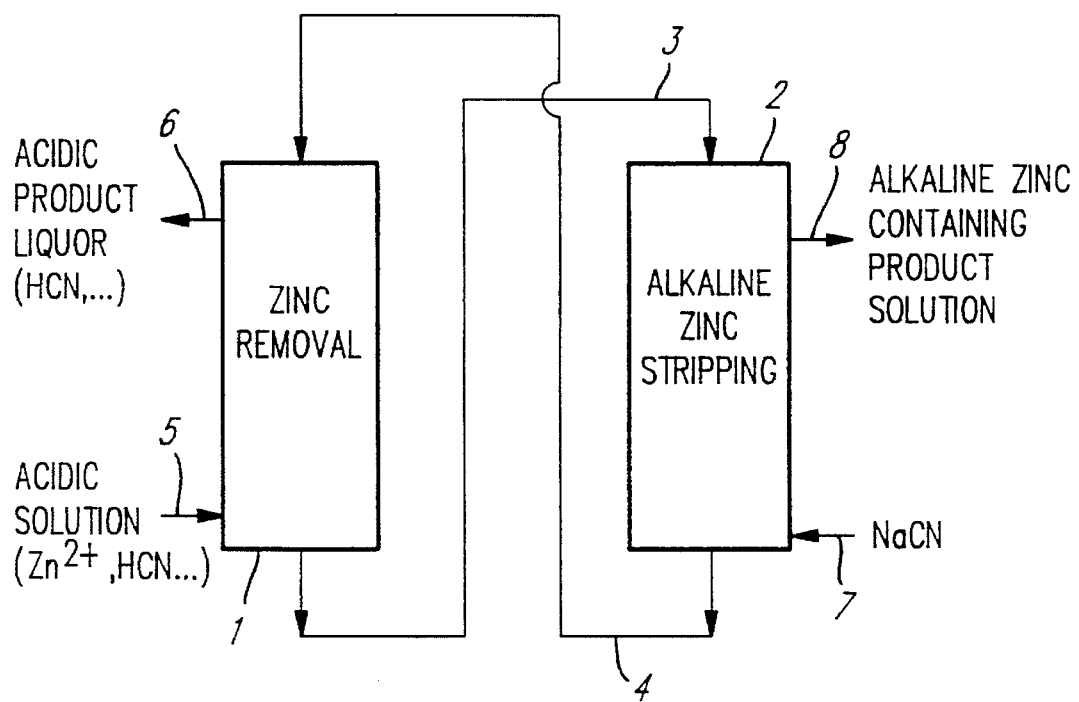
FIG. 1 is a schematic flow diagram of an embodiment of the invention depicting the removal of zinc values from an acidic solution comprising hydrocyanic acid and the recovery of the zinc values in the form of complex zinc cyanide anions.
Figure 2:
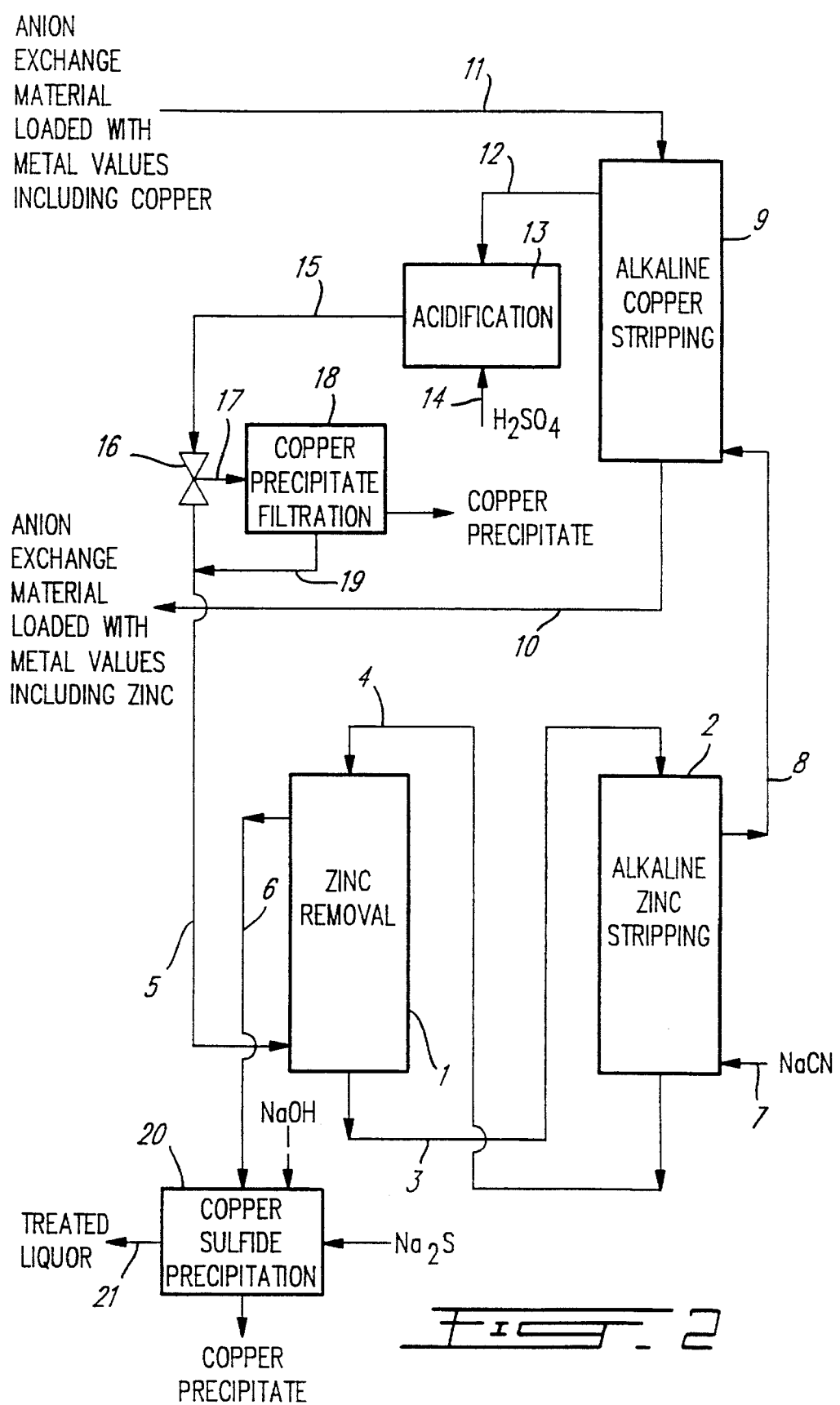
FIG. 2 is a schematic flow diagram of an embodiment of the invention depicting the removal of copper values from an anion exchange material using an alkaline copper eluting solution comprising complex zinc cyanide, the recovery of the zinc values in the form of complex zinc cyanide anions for reuse in the copper eluting solution and the removal of copper values from solution by precipitation.
Figure 3:
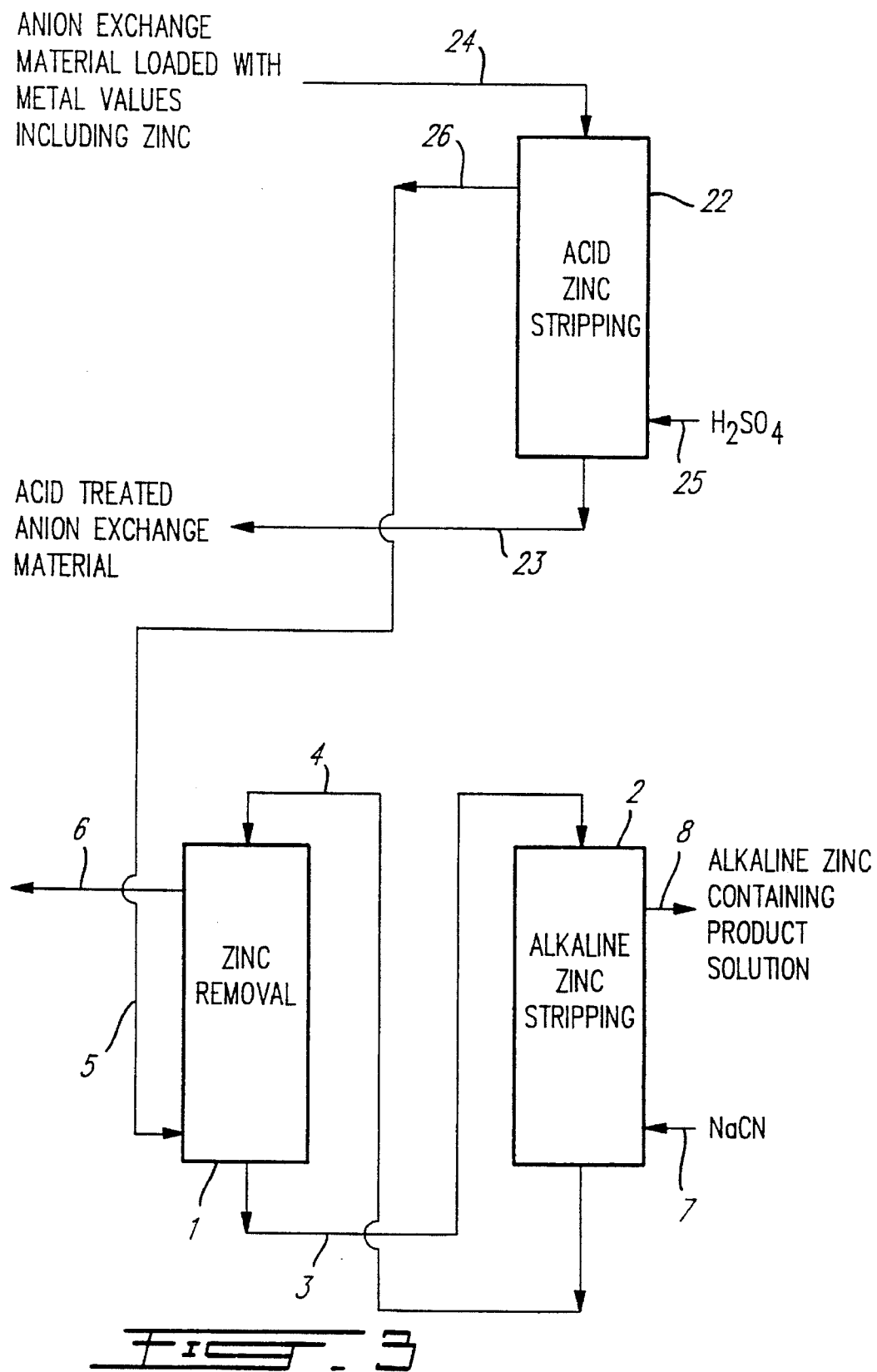
Figure 4:
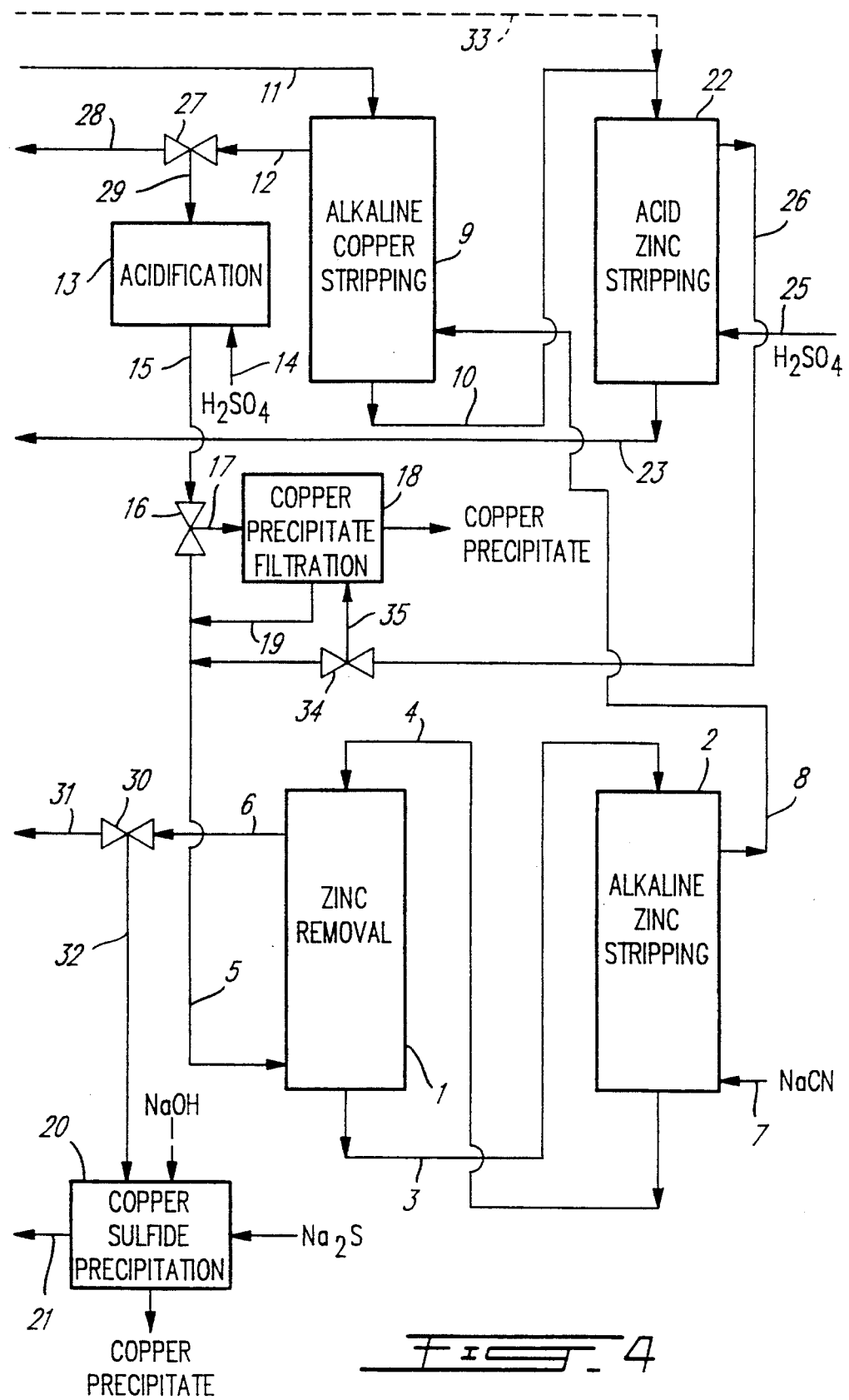

FIG. 3 is a schematic flow diagram of an embodiment of the invention depicting the removal of zinc values from an anion exchange material by acid stripping, the removal of zinc values from the resultant acidic solution comprising hydrocyanic acid and the recovery of the zinc values in the form of complex zinc cyanide anions; and FIG. 4 is a schematic flow diagram of an embodiment of the invention depicting a scheme for copper removal and complex zinc cyanide ion recycling in which the embodiments of the invention illustrated in FIGS. 1, 2 and 3 are shown in an example combined form.

The various processes described hereinafter may for example be carried out at any suitable temperature, e.g. a temperature in the range of from about 5° to about 40° C.

Turning to FIG. 1, this figure illustrates an example of an embodiment of a system for the removal of zinc cations ($Zn^{2+}$) from an acidic solution comprising hydrocyanic acid and the recovery of the zinc values as complex zinc cyanide anions. The zinc recovery system illustrated may, as shall be discussed below, be used to recover zinc tetracyanide for use in the elution of copper from a copper loaded anion exchange material such as Duolite A161 L.

The acidic solution to be treated for zinc removal comprises zinc cations and hydrocyanic acid. The acidic solution may, however, contain additional elements; the acidic solution may, for example, comprise a mineral acid (such as sulphuric acid, hydrochloric acid and the like), precious metal cyanide values, and the like. If the acidic solution is associated with copper values, these values should, preferably, be present to the extent possible as part of a cyanide containing precipitate and not in soluble form. The pH of the acidic solution may take on any acidic value provided that the solution components and process conditions are such that the zinc is in cationic form and any copper, if present, is present essentially as part of a cyanide containing precipitate; the pH may for example be from 2.5 to 1.5 or lower e.g. a pH of 1.0 or lower.

The recovery of the zinc values as complex zinc cyanide anions is a two step process. The system illustrated in FIG.

1 is shown as comprising a zinc removal station 1 and an alkaline zinc stripping station 2. The zinc removal station i and the alkaline zinc stripping station 2 may for example each comprise a column within which a desired solution and exchange material may be intimately contacted; the solution may, for example, be pumped through each column (i.e. rising from a lower part of the column to the top of the column) so as to pass in countercurrent fashion relative to adsorbent material descending through the column i.e. descending from top to bottom thereof. Fresh water may, if desired, be pumped up through the bottom part of each column to wash the descending adsorbent material before it leaves the column. The treated (and if desired washed) adsorbent then passes out of the bottom of each column (e.g. via an automatic discharge valve into a holding tank). The adsorbent leaving each column is transferred (e.g. if the adsorbent material is associated with wash water the mixture may be pumped) to the other column for appropriate treatment therein; the flow of exchange material between stations 1 and 2 is shown by flow lines 3 and 4.

Although the zinc removal and zinc stripping stations 1 and 2 have been described above with reference to two separate columns, a single column or tank may if desired be used, the tank alternately being eluted with acidic solution and then an alkaline solution with appropriate water washing in between such elutions.

With the above in mind, at station 1, zinc values may be removed from an incoming stream of acidic solution (comprising zinc cations and hydrocyanic acid) designated by the reference numeral 5 by contacting the acidic solution with a cation exchange material (preferably a weak acid cation exchange material such as for example Amberlite IR 120 LH) so that zinc cations are adsorbed onto the exchange material; the cationic material must of course be relatively stable or inert in the solutions used herein. The resultant acidic product liquor, leaving as stream 6, comprises hydrocyanic acid and may possibly include copper values as shall be described herein below. If the acidic product liquor does not contain significant or undesired levels of copper values, the acidic product liquor may be treated with a suitable base such as NaOH, $Ca(OH)_2$ and the like to increase the pH thereof to a value above 7 (e.g. a pH of from 9 to 11) which is suitable for the solution to be recycled to a precious metal adsorption circuit for use as a cyanide leach solution in the cyanide leach of precious metals from ore, slime, etc... On the other hand, if undesired levels of copper values (e.g. precipitate) are associated with the acidic product liquor, the mixture may be treated as herein described so as to obtain a precipitate comprising cuprous sulphide which may be separated from the obtained treated liquor, the treated liquor having its pH adjusted upwards to the desired pH for recycling thereof to the precious metal leach circuit as mentioned above.

The obtained zinc loaded cation exchange material leaving station 1 (i.e. leaving the bottom of the column used for station 1) is transferred via line 3 to the zinc stripping station 2. At station 2 the zinc loaded cation exchange material is contacted with an alkaline solution introduced via line 7, the alkaline solution comprising an alkali metal cyanide such as NaCN (e.g. an aqueous solution of NaCN). The contact conditions including the pH and the CN content of the alkaline solution are of course sufficient so as to induce the stripping of zinc from the cation exchange material and form an alkaline zinc containing product solution leaving via line 8; the alkaline zinc containing product solution comprising complex zinc cyanide anions. The treated cation exchange material obtained is recycled via line 4 back to the zinc removal station and the zinc removal\recovery process is recommenced.

By way of example, the (aqueous) acidic solution may have a pH of 1 to 2, comprise $Zn^{2+}$ (1030 ppm), sulphuric acid and hydrocyanic acid (5000 to 9000 ppm CN), and be associated with a copper cyanide containing precipitate (18000 to 27000 ppm). 78 liters of this acidic solution may be contacted at 20° C. with 47 kg of a Amberlite IR 120 LH (resin) loaded with $Na^+$, contact being carried out for 77 min. The obtained acidic product liquor may have a pH of 1.0 to 2.0, comprise $Zn^{2+}$ (4 to 50 ppm), sulphuric acid and hydrocyanic acid (5000 to 9000 ppm CN), and be associated with a copper cyanide containing precipitate (18000 to 27000 ppm). The separated obtained zinc loaded cation exchange resin may comprise 20 grams of adsorbed $Zn^{2+}$ per kg of resin.

The obtained zinc loaded cation exchange resin comprising 20 grams $Zn^{2+}$ per kg of resin may be contacted at 20° C. with 45 to 55 liters of an (aqueous) 1 to 3M NaCN alkaline zinc eluting solution for a period of 60 minutes. The obtained alkaline zinc containing product solution may be a 0.05 to 5.0 M $Zn(CN)_4^{2-}$ solution having a pH of 10 to 12.

Turning to FIG. 2, this figure illustrates an embodiment of an aspect of the present invention wherein copper values may be stripped from an anion exchange material using an alkaline copper eluting solution comprising complex zinc cyanide anions. The illustrated system incorporates the zinc removal\zinc recovery system shown in FIG. 1; the same reference numerals are thus used to designate the common elements.

The system illustrated in FIG. 2 is shown as comprising an alkaline copper stripping station 9. The alkaline copper stripping station 9 may for example comprise a column within which a desired solution and exchange material may be intimately contacted; the solution may, for example, be pumped through the column (i.e. rising from a lower part of the column to the top of the column) so as to pass in countercurrent fashion relative to adsorbent material .descending through the column (i.e. descending from top to bottom thereof). Fresh water may, if desired, be pumped up through the bottom part of each column to wash the descending adsorbent. The treated (and if desired washed) adsorbent then passes out of the bottom of each column (e.g. via an automatic discharge valve into a holding tank). The treated adsorbent leaving the column may be transferred (by pumping of a slurry of resin and associated wash water) via line 10 to another station for appropriate treatment therein.

With the above in mind, copper values may be removed, at station 9, from an incoming stream 11 of an anion exchange material, the anion exchange material being loaded with precious metal values and copper values in the form of adsorbed complex metal cyanide anions.

Preferably, the anion exchange material is a strong base anion exchange material such as such as Duolite A161 L. The anionic exchange material must of course be relatively stable or inert in the solutions used herein; the anion exchange material should have good resistance to osmotic shock when changing the composition, temperature and pH of the solutions contacting it; similarly for the cation exchange material.

Copper is removed from the anion exchange material at station 9 by contacting the anion exchange material with an alkaline copper eluting solution (stream 8) comprising complex zinc cyanide anions so that zinc is adsorbed onto the exchange material while displacing copper into the alkaline eluting solution.

Preferably, the alkaline solution of zinc which is used, is able to displace copper from the anion exchange material such that the obtained alkaline eluate comprises complex copper cyanide anions, the anion exchange material is loaded with zinc from the alkaline solution, and the anion exchange material is left with at least the substantial part of the precious metal values initially present thereon; in this latter respect precious metal values may be built up on the anion exchange material by recycling the anion exchange material to the precious metal adsorption circuit.

It is theoretically possible to adjust process conditions for station 9 such that the amount of zinc values present in the eluting solution in stream 8 is such as to be equal to or less than the amount needed to sluts all of the copper from the anion exchange material; in such a case the alkaline eluate may not contain any significant amount of zinc values and the alkaline eluate stream 12 could be passed directly to a copper removal station such as described herein. It may, for example, be desired to purposely leave a given amount of copper on the anion exchange material.

In practice, however, the initial copper content of the anion exchange material may vary over time so as to make it difficult to practically adjust the flow of the copper eluting solution in response to such changes. Accordingly, the resultant alkaline eluate which is removed as stream 12 may in addition to complex copper cyanide anions include at least some significant amount of zinc values. On the other hand, in some cases, it may be intentionally desired that the amount of the zinc and copper complexes at station 9 be such that zinc values will flow through to the alkaline eluate; e.g. to maximize the amount of copper removed from the anion exchange resin. The system in FIG. 2 is meant to deal with the case where the alkaline eluate does include zinc values (present, for any reason whatsoever) which are to be recovered and recycled as complex zinc cyanide anions.

Thus as shown in FIG. 2, the stream 12 comprising complex copper cyanide anions and complex zinc cyanide anions is directed to an acidification station 13 wherein the alkaline eluate is admixed with a suitable acidification agent such as sulphuric acid; see stream 14. The degree to which the alkaline eluate is acidified (i.e. the ultimate acidic pH of the product solution) will depend on whether or not it is desired to recover copper as a precipitate before or after submitting the solution to zinc removal\recovery.

If it is desired to remove copper values prior to zinc removal, then sufficient mineral acid such as sulphuric acid may be added by stream 14 so as to reduce the pH such that copper values may precipitate out as a precipitate of CuCN (e.g. the pH being lowered to 1.0 or less) and the acidic product solution comprises zinc cations hydrocyanic acid. Thereafter, the mixture of precipitate and acidic product solution may be sent via stream 15 to a two-way valve means 16 which directs the mixture through stream or flow-line 17 to a precipitate filtration station 18 to separate the CuCN precipitate. The obtained filtrate or treated acidic product solution is then directed via line 19 to line 5 for delivery to the zinc removal station 1 for the removal and recovery of zinc as described above. On the other hand, if it is desired to remove copper values only after zinc removal, then a somewhat higher pH may be used to form the above mentioned mixture of acidic product solution and associated CuCN precipitate (e.g. a pH of from 1.5 to 2.5° preferably 2.0). The mixture of precipitate and acidic product solution is then delivered via line 15 to the valve 16 which directs the mixture to line 5 for delivery to the zinc removal station 1 for the removal and recovery of zinc as described above.

Once delivered to the zinc removal station 1, the acidic product solution (filtered or otherwise) is dealt with as described above to recover an alkaline zinc containing product solution (comprising complex zinc cyanide anions) which is removed via line 8 for delivery back to station 9 for use as the alkaline copper eluting solution (with or without dilution) to strip more copper from copper loaded anion exchange material.

The acidic product liquor obtained form station 1 may, if the copper content is not significant (e.g. due to prior copper precipitation) be directed to a pH adjustment station wherein the pH of the liquor may be raised to a level suitable for using the solution as a cyanide leach solution in a precious metal leach circuit.

If the acidic product liquor is associated with a significant amount of copper values (precipitate) then the treated mixture may be directed via line 6 to a copper precipitation station 20 wherein the copper values may, for example, be precipitated as $Cu_2S$ as shown in FIG. 2. In the latter case it may be necessary to raise the pH of the solution (with a suitable base such as NaOH) to about 5 to about 6 and thereafter admix a suitable alkali metal sulphide (e.g. potassium sulphide, sodium sulphide, etc..) therewith to precipitate copper as cuprous sulphide. The copper precipitate may then be filtered off and the obtained treated liquor may be sent on via line 21 to a pH adjustment station wherein the pH of the liquor may be raised to a level suitable for using the solution as a cyanide leach solution in the precious metal leach circuit.

By way of example only, 24 to 48 kg of Duolite A161 L may be contacted for a period of 45 to 60 min. with 400 liters of a pulp or slurry comprising a cyanide leach solution and a precious metal bearing particles; the slurry having a solids content of 35 to 55 percent by weight. The cyanide leach solution may have a pH of 9 to 11 and comprise an initial free CN content of 50 to 300 ppm; the precious metal bearing particles have a size which is substantially smaller than that of the particles of anion exchange resin so as to facilitate separation thereof from the slurry including the leached particles. The so obtained metal loaded anion exchange resin may have adsorbed thereon the following metal values:

40000 to 60000 ppm Cu (685 to 1712 g Au per tonne (or 20 to 50 oz. Au per ton) resin (dry weight)

2500 to 3000 ppm Zn 2000 to 5000 ppm Fe.

If it is intended that substantially all of the initial precious metal values remain on the anion exchange resin, 5 to 6 kg of the metal loaded anion exchange resin may be contacted at 20° C., for a period of 30 min., with 9 liters of an alkaline copper eluting solution of about 0.06M $Zn(CN)_4^{2-}$; the process being carried out more or less in the absence of air (i.e. in the absence of an oxidizing agent). The alkaline copper eluting solution may comprise water diluted alkaline zinc containing product solution from station 2 having an initial pH 12 and comprising 0.1 M $Zn(CN)_4^{2-}$. The obtained treated zinc loaded anion exchange resin may have adsorbed thereon the following metal values:

5000 to 10000 ppm Cu 685 to 1712 g Au per tonne (or 20 to 50 oz. Au per ton) resin (dry weight)

90000 to 100000 ppm Zn 100 to 500 ppm Fe.

The alkaline eluate having a pH of 10 to 12 and comprising about 4200 ppm $Zn(CN)_4^{2-}$ and 1000 to 6500 ppm $Cu(CN)_4^{2-}$ may be admixed (more or less in the absence of air, i.e. in the absence of an oxidizing agent) with sufficient 1 to 4N sulphuric acid so as to lower the pH to 2.0 and obtain a mixture of CuCN precipitate and an acidic product solution comprising 500 to 1000 ppm $Zn^{2+}$ and 5200 to 9400 ppm hydrocyanic acid; the solids content of the mixture being 5 to 10 percent by weight. This mixture may then be passed on to the zinc removal station 1 for treatment as described above so as to obtain an alkaline zinc containing product solution from station 2 having an initial pH 12 and comprising 0.1M $Zn(CN)_4^{2}$. The treated mixture from station 1 may comprise a treated liquor (of pH 1 to 2) and CuCN precipitate; the treated liquor may comprise the following values 5000 to 9000 ppm free CN 0.0 to 0.1 ppm Au 4 to 50 ppm Zn 0.8 to 10 ppm Fe.

The treated mixture may be sent to the copper sulphide precipitate station 20 wherein sufficient 1 to 10M NaOH solution may be admixed therewith to adjust the pH to about 5 to 6. Thereafter sufficient 3.2M $Na_2S$ solution may be admixed therewith to convert copper values to $Cu_2S$ precipitate. The treated liquor is then separated from the obtained cuprous sulphide and sent on to pH adjustment station to have its pH raised to a level whereby the cyanide values (5000 to 9000 ppm free CN) therein may be reused in a precious metal leach circuit.

By way of example only, 72 liters of the above described treated mixture (pH 1 to 2) containing precipitate (18000 to 27000 ppm CuCN) may be mixed with about 2.88 liters of 3.82M NaOH to obtain a pH adjusted mixture of pH 5 to 6. The pH adjusted mixture may be mixed with about 16.6 liters of (aqueous) 3.2M $Na_2S$; the precipitate may be filtered off after about 30 minutes or earlier if desired. The obtained treated liquor may have a pH of about 5 to 6 and comprise Zn2+ (4–50 ppm), hydrocyanic acid (5000 to 9000 ppm CN), and copper values (5 to 10 ppm).

If it is intended that some of the initial precious metal values be removed from an anion exchange resin along with copper, 5 to 6 kg of the metal loaded anion exchange resin may be contacted at 20° C., for a period of 30 min., with an initial alkaline copper eluting solution of about 0.27 M $Zn(CN)_4^{2-}$; the process being carried out more or less absence of air (i.e. in the absence of an oxidizing agent). The initial metal loaded anion exchange resin may have adsorbed thereon the following metal values:

40000 to 90000 ppm Cu (685 to 1712 g Au per tonne (or 20 to 50 oz. Au per ton) resin (dry weight)

2500 to 3000 ppm Zn 2000 to 5000 ppm Fe.

The alkaline copper eluting solution may comprise water diluted alkaline zinc containing product solution from station 2 having an initial pH 12 and comprising 0.5M $Zn(CN)_4^{2-}$. The obtained treated zinc loaded anion exchange resin may have adsorbed thereon the following metal: values:

2400 to 2700 ppm Cu 479 to 514 g Au per tonne (or 14 to 15 oz. Au per ton) resin (dry weight)

90000 to 95000 ppm Zn 200 to 300 ppm Fe.

Thereafter the previously mentioned subsequent steps may be followed.

Turning to FIG. 3, this figure illustrates an embodiment of another aspect of the present invention wherein zinc values may be stripped from an anion exchange material using an acid zinc eluting solution comprising a mineral acid such as sulphuric acid (e.g. an aqueous 1 to 7 normal sulphuric acid solution). The illustrated system incorporates the zinc removal\zinc recovery system shown in FIG. 1; the same reference numerals are thus used to designate the common elements. The system illustrated in FIG. 3 is shown as comprising an acid zinc stripping station 22. The acid zinc stripping station 22 may for example comprise a column within which a desired solution and exchange material may be intimately contacted; the solution may, for example, be pumped through the column (i.e. rising from a lower part of the column to the top of the column) so as to pass in countercurrent fashion relative to adsorbent material descending through the column (i.e. descending from top to bottom thereof). Fresh water may, if desired, be pumped up through the bottom part of the column to wash the descending adsorbent. The treated (and if desired washed) adsorbent then passes out of the bottom of the column (e.g. via an automatic discharge valve into a holding tank). The treated adsorbent leaving the column may be transferred (e.g. mechanically pumped with entrained wash water) via line 23 to another station for appropriate treatment therein or for recycling to a precious metal leach circuit.

With the above in mind zinc values may be removed, at station 22, from an incoming stream 24 of an anion exchange material, the anion exchange material being loaded with precious metal values and zinc values in the form of adsorbed complex metal cyanide anions.

Zinc is removed from the anion exchange material at station 22 by contacting the anion exchange material with an acid zinc eluting solution (stream 25) comprising a mineral acid such as sulphuric or hydrochloric acid so that zinc is removed from the exchange material and passes into the acid eluting solution in zinc cation form; if copper is present, the process is conducted more or less in the absence of air, i.e. in the absence of an oxidizing agent. If copper is loaded on the anion exchange material, the acid stripping may also be conducted so as to leave CuCN precipitate in the interstices of the exchange material for use to scavenge free cyanide as discussed above; see U.S. Pat. No. 3,984,314 referred to above.

If the acidic product eluate also comprises significant amounts of copper values (precipitate), the copper values may be removed before or after the zinc removal\recovery in a manner analogous to that described above with respect to FIG. 2.

Preferably, an acid zinc eluting solution which is used has a strength (e.g. relative concentration) which is able to displace zinc from the anion exchange material such that the exchange material is loaded with at least the substantial part of the precious metal values initially present thereon before the acid stripping; in this latter respect precious metal values may be built up on the anion exchange material by recycling the acid treated anion exchange material to the precious metal adsorption circuit. The acidic product eluate comprising zinc cations and hydrocyanic acid may be directed via line 26 to line 5 for delivery to the system for zinc removal\recovery. The obtained acidic product liquor comprising hydrocyanic acid may be delivered (after any necessary copper precipitate conversion treatment) via line 6 to a pH adjustment station wherein the pH of the liquor may be raised to a level suitable for using the solution as a cyanide leach solution in the precious metal leach circuit.

By way of example only, the acid zinc stripping station may be used to treat a zinc loaded anion exchange material obtained from the above mentioned copper stripping station 9; the strong base anion exchange material being for example Duoilite A161 L. The anion exchange resin to be subjected to the acid stripping may thus have adsorbed thereon the following metal values:

35000 to 45000 ppm Cu 685 to 1712 g Au per tonne (or 20 to 50 oz. Au per ton) resin (dry weight)

20000 to 25000 ppm Zn 1500 to 2500 Fe.

20 to 25 kg of the zinc loaded strong base anion exchange resin (if desired water washed to remove entrained alkaline solution) may be contacted, for a period of 30 min., with an acidic zinc stripping solution comprising 2 to 4N sulphuric acid (pH 1) at 20° C. The obtained acid treated anion exchange resin may have the following metal values 35000 to 45000 ppm Cu 685 to 1712 g Au per tonne (or 20 to 50 oz. Au per ton) resin (dry weight)

1000 to 2000 ppm Zn 1500 to 2500 ppm Fe.

The obtained acidic product solution may be associated with CuCN precipitate and comprise 900 to 1200 ppm $Zn^{2+}$ and 5200 to 9400 ppm hydrocyanic acid; the solids content of the mixture being 5 to 10 percent by weight. This mixture may then be passed on to the zinc removal station 1 for treatment as described above so as to obtain an alkaline zinc containing product solution from station 2. The treated mixture obtained from station 1 comprising copper precipitate may be treated as indicated above to recover $Cu_2S$ and a treated liquor comprising cyanide values which may be recycled as mentioned above.

A process or system for the cyanide recovery of precious metal values which incorporates or exploits various aspects of the present invention and may be divided into three sections:

(a) Precious metal loading: Loading (in conventional or known manner) of cyanide, (precious as well as base) metal complexes (e.g. of gold, of copper, and the like) onto an anion exchange material (e.g. a strong base anion exchange material such as Duolite A161 L) in a precious metal adsorption circuit;

(b) Removal of loaded copper values: Loaded copper values are removed from and the anion exchange material is regenerated in an alkaline\acid elution circuit, the anion exchange material being thereafter recycled to the precious metal adsorption circuit for loading of additional precious metal; and (c) Treatment of the alkaline and acid eluates produced during the elution sequences, including:

recovery and recycling of zinc values in the form of an alkaline solution comprising complex zinc cyanide anions for use as a copper eluting solution in an alkaline copper stripping treatment;

recovery of base metal values (e.g. copper values); and recovery of cyanide values for return to the precious metal (e.g. gold) leach circuit (e.g. as either sodium cyanide or calcium cyanide)

The above stages (b) and (c) may be run as batch, semibatch or continuous processes.

Precious metal Adsorption Circuit

In known manner a continuous stream (e.g. 2 gpm or 10 $m^3$/day) of a cyanide slurry (comprising free cyanide values, a metal bearing solid material, complex metal cyanide anions (e.g. precious metals such as gold and silver as well as base metals such as copper, iron, zinc and the like) may be fed to a plurality of mechanically agitated adsorption contactor tanks via a trash screen. The trash screen will remove any near size material that could otherwise become trapped in the anion exchange material processing loop or circuit.

Slurry may flow through the contactor tanks in series, leaving each tank or stage via a mechanically wiped interstage screen which retains anion exchange material in the tanks.

The (precious) metal adsorbent (i.e. anion exchange material) may be moved upstream, countercurrent to the slurry flow by means of small pumps, operated continuously. Movement of the anion exchange material is governed by the residue tenors desired, the need to maintain fixed concentrations of adsorbent in the tanks and to provide metal loaded anion exchange material for further treatment.

Slurry leaving the last contactor may be passed though a safety screen (which acts as a scavenger in case of failure of the interstage screen mesh) and into the tailings return sump, from where it is pumped into the main plant tailings sump.

Metal loaded adsorbent from the first adsorption tank (i.e. the first tank into which slurry is introduced) is transferred to a recovery screen where it may be washed with water sprays before passing into a holding tank. The metal loaded adsorbent may then be transferred to a system, in accordance with the present invention, as shown in FIG. 4.

Removal of loaded copper values-Treatment of the alkaline and acid eluates produced during the elution sequences FIG. 4 is a schematic flow diagram of an embodiment of a system in accordance with the present invention depicting a scheme for copper removal and complex zinc cyanide ion recycling in which the embodiments of the invention illustrated in FIGS. 1, 2 and 3 are shown in a combined form; the same reference numerals are thus used to designate the common elements. Accordingly, all of the above comments with respect to FIGS. 1, 2 and 3 apply to FIG. 4.

The system illustrated in FIG. 4 is shown, however, with a number of valve means and attendant flow lines for dealing with the optional treatment of acidic solutions in relation to the removal of copper from solutions before or after zinc removal.

Thus, the system shown in FIG. 4 has a two-way valve means 27 linked to flow lines 12, 28 and 29. If the alkaline eluate delivered via line 12 has insignificant zinc values the eluate may be directed to a separate copper removal station which may comprise stations analogous to stations 13, 18 and 20 for the precipitation and recovery of copper values as CuCN or $Cu_2S$. Alternatively, the valve 27 may not be present in favour of a similar valve means in the flow-line 5 just before station 1; this other valve means could, if the solution has no or negligible zinc, redirect (as desired) the acidic solution (away from the zinc removal station 1) directly to the copper precipitation station 20.

The system also is shown with two way valve means 30 for directing the acidic product liquor via line 31 from line 6 to a pH adjustment station as described above, i.e. if the acidic product liquor has insignificant copper levels. If the acidic liquor has copper values which must be removed the valve means may direct the liquor from line 6 via line 32 to the precipitation station 20.

The system shown in FIG. 4 also shows an optional anion exchange material flow line 33. This line is intended to provide the possibility of directing (a portion of) untreated anion exchange material (i.e. exchange material which has not been sent through the alkaline copper stripping station 9) directly to the acid zinc stripping station 22. The anion exchange material of line 33 is intended to be commingled with any treated anion exchange material from station 1 before being introduced into the station 22, the obtained acidic product eluate (and any associated cyanide containing precipitate) being treated as described above. The ratio of the amount of anion exchange material sent to station I relative to the amount sent to station 22 will depend on the circumstances and may vary in accordance with the amount of copper in the upstream circuit which must be captured and\or also in accordance with the desire to give the acid treated anion exchange resin the capacity to scavenge free CN from upstream circuits (e.g. from barren solutions containing cyanide) for recovery e.g. in the acid zinc stripping stage. Keeping the above in mind the ratio may take on any desired value (e.g. 1:0.0 to 1:10; the ratio of 1:0.0 meaning that all of the anion exchange material is sent through the copper stripping treatment stage). For example, if copper is present in the initial metal adsorption circuit at a level of 500 ppm the ratio may be 1:3; on the other hand if copper is present in the initial adsorption circuit at a level of 5 ppm the ratio may be 1:300.

In FIG. 4 the input source of sulphuric acid may, if desired, be (substantially) limited to the flow line 25. The acidic product eluate flowing in line 26 could for example be used as the source of acid for the acidification station 13. If desired the flow through line 26 may be redirected by two-way valve means 34 to pass through line 36 to the filtration station 18 for the preliminary removal of CuCN precipitate before the solution in line 26 is delivered to the zinc removal station 1; the filtrate being delivered to station 1 via lines 19 and 5.

We claim:

1. A method for removing copper values from an anion exchange material, said anion exchange material being loaded with initial copper and precious metal values, said method comprising i) subjecting an anion exchange material loaded with adsorbed complex copper cyanide anions and adsorbed complex precious metal cyanide anions, to a copper stripping treatment step for removing copper values therefrom, said copper stripping treatment step comprising contacting said anion exchange material with an alkaline copper eluting solution comprising zinc complex cyanide ions so as to obtain an alkaline eluate comprising complex copper cyanide anions and complex zinc cyanide anions and a treated zinc loaded anion exchange material loaded with precious metal values and adsorbed complex zinc cyanide anions, ii) admixing an acidification agent with so obtained alkaline eluate so as to obtain a mixture comprising an acidic product solution and a cyanide containing precipitate, said acidic product solution comprising zinc cations and hydrocyanic acid, said cyanide containing precipitate comprising copper values and cyanide values, iii) subjecting so obtained acidic product solution to a zinc removal step for removing zinc cations therefrom, said zinc removal step comprising contacting the acidic product solution with a cation exchange material so as to obtain an acidic product liquor comprising hydrocyanic acid and a cation exchange material loaded with adsorbed zinc cations, iv) subjecting so obtained cation exchange material loaded with adsorbed zinc cations to an alkaline zinc stripping treatment step for removing zinc values therefrom, said alkaline zinc stripping treatment step comprising contacting cation exchange material loaded with adsorbed zinc cations, with an alkaline zinc eluting solution comprising an alkali metal cyanide so as to obtain an alkaline zinc containing product solution and a treated cation exchange material, said alkaline zinc containing product solution comprising complex zinc cyanide anions, and v) recycling so obtained treated cation exchange material to said zinc removal step.

2. A method as defined in claim 1 wherein complex zinc cyanide anions of said alkaline zinc containing product solution are recycled to said copper stripping treatment step.

3. A method as defined in claim 2 wherein so obtained acidic product solution, before being subjected to said zinc removal step, is subjected to a precipitate recovery step for separating cyanide containing precipitate therefrom.

4. A method as defined in claim 2 wherein a mixture as obtained from step (ii) is passed to said zinc removal step, said mixture being contacted with the cation exchange material so as to obtain a product mixture comprising said acidic product liquor and said cyanide containing precipitate.

5. A method as defined in claim 3 wherein cyanide containing precipitate obtained from said precipitate recovery step is subjected to a copper precipitate conversion treatment so as to obtain a treated mixture, said treated mixture comprising a copper containing precipitate and a treated liquor, said copper containing precipitate comprising cuprous sulphide, said treated liquor comprising soluble cyanide values and wherein said treated mixture is subjected to a precipitate separation step for recovering treated liquor from said treated mixture, said copper precipitate conversion treatment comprising contacting an aqueous mixture having a pH of from about 4 to about 6 with a soluble sulphide so as to obtain said copper containing precipitate and said treated liquor, said aqueous mixture comprising water and recovered cyanide containing precipitate.

6. A method as defined in claim 4 wherein a product mixture as obtained from said zinc removal step is subjected to a copper precipitate conversion treatment so as to obtain a treated mixture, said treated mixture comprising a copper containing precipitate and a treated liquor, said copper containing precipitate comprising cuprous sulphide, said treated liquor comprising soluble cyanide values and wherein said treated mixture is subjected to a precipitate separation step for recovering treated liquor from said treated mixture, said copper precipitate conversion treatment comprising adjusting the ph of the product mixture so as to obtain a pH adjusted mixture having a pH of from about 4 to about 6 and contacting the pH adjusted mixture with a soluble sulphide so as to obtain said copper containing precipitate and said treated liquor.

7. A method as defined in claim 1 wherein said acidification agent comprises a mineral acid.

8. A method as defined in claim 3 wherein said acidification agent comprises sulphuric acid, said alkaline zinc eluting solution comprises sodium cyanide, said anion exchange material is a strong base anion exchange resin and said cation exchange material is a weak acid cation exchange resin.

9. A method as defined in claim 4 wherein said acidification agent comprises sulphuric acid, said alkaline zinc eluting solution comprises sodium cyanide, said anion exchange material is a strong base anion exchange resin and said cation exchange material is a weak acid cation exchange resin.

10. A method as defined in claim 5 wherein said soluble sulphide comprises an alkali metal sulphide.

11. A method as defined in claim 6 wherein said soluble sulphide comprises an alkali metal sulphide.

12. A method as defined in claim 10 wherein said acidification agent comprises sulphuric acid, said mixture obtained from step (ii) comprises a precipitate of CuCN, said zinc cation loaded cation exchange material is contacted with an alkaline zinc eluting solution comprising sodium cyanide, said anion exchange material is a strong base anion exchange resin and said cation exchange material is a weak acid cation exchange resin.

13. A method as defined in claim 11 wherein said acidification agent comprises sulphuric acid, said mixture obtained from step (ii) comprises a precipitate of CuCN, said zinc cation loaded cation exchange material is contacted with an alkaline zinc eluting solution comprising sodium cyanide, said anion exchange material is a strong base anion exchange resin and said cation exchange material is a weak acid cation exchange resin.

14. A method as defined in claim 12 wherein said soluble sulphide comprises Sodium sulphide.

15. A method as defined in claim 13 wherein said soluble sulphide comprises sodium sulphide.

16. A method for recovering complex zinc cyanide anions from an anion exchange material, said anion exchange material being loaded with initial zinc and precious metal values, said method comprising
   i) subjecting an anion exchange material loaded with adsorbed complex zinc cyanide anions and adsorbed complex precious metal cyanide anions, to an acid zinc stripping treatment step for removing zinc values therefrom, said acid zinc stripping treatment step comprising contacting said anion exchange material with an acidic zinc eluting solution so as to obtain an acidic product eluate comprising zinc cations and hydrocyanic acid and an acid treated anion exchange material loaded with substantially all of the initial precious metal values,
   ii) subjecting so obtained acidic product eluate to a zinc removal step for removing zinc cations therefrom, said zinc removal step comprising contacting the acidic product solution with a cation exchange material so as to obtain a cation exchange material loaded with adsorbed zinc cations and an acidic product liquor comprising hydrocyanic acid, and
   iii) subjecting so obtained cation exchange material loaded with adsorbed zinc cations to an alkaline zinc stripping treatment step for removing zinc values therefrom, said alkaline zinc stripping treatment step comprising contacting said cation exchange material loaded with adsorbed zinc cations, with an alkaline zinc eluting solution comprising an alkali metal cyanide so as to obtain an alkaline zinc containing product solution and a treated cation exchange material, said alkaline zinc containing product solution comprising complex zinc cyanide anions.

17. A method as defined in claim 16 wherein so obtained treated cation exchange material is recycled to said zinc removal step.

18. A method as defined in claim 17 wherein said anion exchange material loaded with adsorbed complex zinc cyanide anions and adsorbed complex precious metal cyanide anions is also loaded with complex copper cyanide anions and said anion exchange material loaded with adsorbed complex copper cyanide anions is subjected to said acid zinc stripping treatment such that the obtained acid treated anion exchange material is impregnated with CuCN.

19. A method as defined in claim 18 wherein a said so obtained acidic product eluate is associated with cyanide containing precipitate, said cyanide containing precipitate comprising copper values and cyanide values and wherein a so obtained acidic product solution, before being subjected to said zinc removal step, is subjected to a precipitate recovery step for separating cyanide containing precipitate therefrom.

20. A method as defined in claim 18 wherein a said so obtained acidic product eluate is associated with cyanide containing precipitate, said cyanide containing precipitate comprising copper values and cyanide values and wherein a mixture of so obtained acidic product eluate and cyanide containing precipitate, is passed to said zinc removal step, said mixture being contacted with the cation exchange material so as to obtain a product mixture comprising said acidic product liquor and said cyanide containing precipitate.

21. A method as defined in claim 19 wherein cyanide containing precipitate obtained from said precipitate recovery step is subjected to a copper precipitate conversion treatment so as to obtain a treated mixture, said treated mixture comprising a copper containing precipitate and a treated liquor, said copper containing precipitate comprising cuprous sulphide, said treated liquor comprising soluble cyanide values and wherein said treated mixture is subjected to a precipitate separation step for recovering treated liquor from said treated mixture,
   said copper precipitate conversion treatment comprising contacting an aqueous mixture having a pH of from about 4 to about 6 with a soluble sulphide so as to obtain said copper containing precipitate and said treated liquor, said aqueous mixture comprising water and recovered cyanide containing precipitate.

22. A method as defined in claim 20 wherein a product mixture as obtained from said zinc removal step is subjected to a copper precipitate conversion treatment so as to obtain a treated mixture, said treated mixture comprising a copper containing precipitate, said copper containing precipitate comprising cuprous sulphide, said treated liquor comprising soluble cyanide values and wherein said treated mixture is subjected to a precipitate separation step for recovering treated liquor from said treated mixture,
   said copper precipitate conversion treatment comprising adjusting the ph of the product mixture so as to obtain a pH adjusted mixture having a pH of from about 4 to about 6 and contacting the pH adjusted mixture with a soluble sulphide so as to obtain said copper containing precipitate and said treated liquor.

23. A method as defined in claim 16 wherein said acidic zinc eluting solution comprises a mineral acid.

24. A method as defined in claim 18 wherein said acidic zinc eluting solution comprises sulphuric acid, said alkaline zinc eluting solution comprises sodium cyanide, said anion exchange material is a strong base anion exchange resin and said cation exchange material is a weak acid cation exchange resin.

25. A method as defined in claim 19 wherein said acidic zinc eluting solution comprises sulphuric acid, said cyanide containing precipitate comprises CuCN, said alkaline zinc eluting solution comprises sodium cyanide, said anion exchange material is a strong base anion exchange resin and said cation exchange material is a weak acid cation exchange resin.

26. A method as defined in claim 20 wherein said acidic zinc eluting solution comprises sulphuric acid, said cyanide containing precipitate comprises CuCN, said alkaline zinc eluting solution comprises sodium cyanide, said anion exchange material is a strong base anion exchange resin and said cation exchange material is a weak acid cation exchange resin.

27. A method as defined in claim 21 wherein said acidic zinc eluting solution comprises sulphuric acid, said cyanide containing precipitate comprises CuCN, said alkaline zinc eluting solution comprises sodium cyanide, said soluble sulphide comprises an alkali metal sulphide, said anion exchange material is a strong base anion exchange resin and said cation exchange material is a weak acid cation exchange resin.

28. A method as defined in claim 22 wherein said acidic zinc eluting solution comprises sulphuric acid, said cyanide containing precipitate comprises CuCN, said alkaline zinc eluting solution comprises sodium cyanide, said soluble sulphide comprises an alkali metal sulphide, said anion exchange material is a strong base anion exchange resin and said cation exchange material is a weak acid cation exchange resin.

29. A method as defined in claim 27 wherein said soluble sulphide comprises sodium sulphide.

30. A method as defined in claim 28 wherein said soluble sulphide comprises sodium sulphide.

31. A method for removing copper values from an anion exchange material, said anion exchange material being loaded with initial copper and precious metal values, said method comprising
  i) subjecting an anion exchange material loaded with adsorbed complex copper cyanide anions and adsorbed complex precious metal cyanide anions, to a copper stripping treatment step for removing copper values therefrom, said copper stripping treatment step comprising contacting said anion exchange material loaded with adsorbed complex copper cyanide anions and adsorbed complex precious metal cyanide anions, with an alkaline copper eluting solution comprising zinc complex cyanide ions so as to obtain an alkaline first eluate comprising complex copper cyanide anions and an alkaline treated zinc loaded anion exchange material loaded with adsorbed complex zinc cyanide anions and precious metal values,
  ii) subjecting so obtained alkaline treated zinc loaded anion exchange material to an acid zinc stripping treatment step for removing zinc values therefrom, said acid zinc stripping treatment step comprising contacting the alkaline treated zinc loaded anion exchange material with an acidic zinc eluting solution so as to obtain an acidic product eluate comprising zinc cations and hydrocyanic acid and an acid treated anion exchange material loaded with precious metal values,
  iii) subjecting so obtained acidic product eluate to a zinc removal step for removing zinc cations therefrom, said zinc removal step comprising contacting the acidic product eluate with a cation exchange material so as to obtain a cation exchange material loaded with adsorbed zinc cations and an acidic product liquor comprising hydrocyanic acid,
  iv) subjecting so obtained cation exchange material loaded with zinc cations to an alkaline zinc stripping step for removing zinc values therefrom, said alkaline zinc stripping step comprising contacting said cation exchange material loaded with zinc cations, with an alkaline zinc eluting solution comprising an alkali metal cyanide so as to obtain an alkaline zinc containing product solution and a treated cation exchange material, said alkaline zinc containing product solution comprising complex zinc cyanide anions,
  v) recycling complex zinc cyanide anions of said alkaline zinc containing product solution to said copper stripping treatment step, and
  vi) recycling so obtained treated cation exchange material to said zinc removal step.

32. A method as defined in claim 31 wherein said copper stripping treatment step removes a portion of the copper values from said anion exchange material loaded with adsorbed complex copper cyanide anions and adsorbed complex precious metal cyanide anions such that said alkaline treated zinc loaded anion exchange material is loaded with adsorbed complex copper cyanide anions and a so obtained alkaline treated zinc loaded anion exchange material loaded with complex copper cyanide anions is subjected to said acid zinc stripping treatment such that the obtained acid treated anion exchange material is impregnated with CuCN.

33. A method as defined in claim 31 wherein said alkaline first eluate comprises complex copper cyanide anions and complex zinc cyanide anions, and characterized in that
  an acidification agent is admixed with said alkaline first eluate so as to obtain a first mixture comprising an acidic first solution and a cyanide containing precipitate, said acidic first solution comprising zinc cations and hydrocyanic acid, said cyanide containing precipitate comprising copper values and cyanide values,
  so obtained acidic first solution is subjected to a zinc removal step for removing zinc cations therefrom, said zinc removal step comprising contacting the acidic first eluent solution, with a cation exchange material so as to obtain a cation exchange material loaded with adsorbed zinc cations and an acidic product liquor comprising hydrocyanic acid,
  a so obtained cation exchange material loaded with adsorbed zinc cations is subjected to an alkaline zinc stripping step for removing zinc values therefrom, said alkaline zinc stripping step comprising contacting said cation exchange material loaded with adsorbed zinc cations, with an alkaline zinc eluting solution comprising an alkali metal cyanide so as to obtain an alkaline zinc containing product solution and a treated cation exchange material, said alkaline zinc containing product solution comprising complex zinc cyanide anions, complex zinc cyanide anions of said alkaline zinc containing product solution are recycled to said copper stripping treatment step, and
  so obtained treated cation exchange material is recycled to said zinc removal step.

34. A method as defined in claim 33 wherein a so obtained acidic product solution, before being subjected to a said zinc removal step, is subjected to a precipitate recovery step for separating cyanide containing precipitate therefrom.

35. A method as defined in claim 33 wherein a mixture comprising said acidic first solution and said cyanide containing precipitate is passed to a said zinc removal step, said mixture being contacted with the cation exchange material so as to obtain a product mixture comprising said acidic product liquor and said cyanide containing precipitate.

36. A method as defined in claim 34 wherein cyanide containing precipitate obtained from said precipitate recovery step is subjected to a copper precipitate conversion treatment so as to obtain a treated mixture, said treated mixture comprising a copper containing precipitate and a treated liquor, said copper containing precipitate comprising cuprous sulphide, said treated liquor comprising soluble cyanide values and wherein said treated mixture is subjected to a precipitate separation step for recovering treated liquor from said treated mixture,
  said copper precipitation treatment comprising contacting an aqueous mixture having a pH of from about 4 to about 6 with a soluble sulphide so as to obtain said copper containing precipitate and said treated liquor, said aqueous mixture comprising water and recovered cyanide precipitate.

37. A method as defined in claim 35 wherein a product mixture as obtained from said zinc removal step is subjected to a copper precipitate conversion treatment so as to obtain a treated mixture, said treated mixture comprising a copper containing precipitate, said copper containing precipitate comprising cuprous sulphide, said treated liquor comprising soluble cyanide values and wherein said treated mixture is subjected to a precipitate separation step for recovering treated liquor from said treated mixture, said copper precipitate conversion treatment comprising contacting an aqueous mixture having a pH of from about 4 to about 6 with a soluble sulphide so as to obtain said copper containing precipitate and said treated liquor.

38. A method as defined in claim 31 wherein said alkaline first eluate comprises complex copper cyanide anions and complex zinc cyanide anions, and characterized in that an acidification agent is admixed with a said so obtained alkaline first eluate so as to obtain a first mixture comprising an acidic first solution and a cyanide containing precipitate, said acidic first solution comprising zinc cations and hydrocyanic acid, said cyanide containing precipitate comprising copper values and cyanide values, a so obtained first mixture is commingled with acidic product eluate to obtain a commingled acidic mixture comprising an acidic mixed solution and cyanide containing precipitate, and a so obtained acidic mixed solution is subjected to said zinc recovery step so as to obtain a cation exchange material loaded with zinc cations and said acidic product liquor.

39. A method as defined in claim 38 wherein a so obtained acidic mixed solution, before being subjected to a said zinc removal step, is subjected to a precipitate recovery step for separating cyanide containing precipitate therefrom.

40. A method as defined in claim 38 wherein a commingled acidic mixture comprising said acidic mixed solution and said cyanide containing precipitate is passed to a said zinc removal step, said mixture being contacted with the cation exchange material so as to obtain a product mixture comprising said acidic product liquor and said cyanide containing precipitate.

41. A method as defined in claim 39 wherein cyanide containing precipitate obtained from said precipitate recovery step is subjected to a copper precipitate conversion treatment so as to obtain a treated mixture, said treated mixture comprising a copper containing precipitate and a treated liquor, said copper containing precipitate comprising cuprous sulphide, said treated liquor comprising soluble cyanide values and wherein said treated mixture is subjected to a precipitate separation step for recovering treated liquor from said treated mixture, said copper precipitate conversion treatment comprising contacting an aqueous mixture having a pH of from about 4 to about 6 with a soluble sulphide so as to obtain said copper containing precipitate and said treated liquor, said aqueous mixture comprising water and recovered cyanide precipitate.

42. A method as defined in claim 40 wherein a product mixture as obtained from said zinc removal step is subjected to a copper precipitate conversion treatment so as to obtain a treated mixture, said treated mixture comprising a copper containing precipitate, said copper containing precipitate comprising cuprous sulphide, said treated liquor comprising soluble cyanide values and wherein said treated mixture is subjected to a precipitate separation step for recovering treated liquor from said treated mixture, said copper precipitate conversion treatment comprising contacting an aqueous mixture having a pH of from about 4 to about 6 with a soluble sulphide so as to obtain said copper containing precipitate and said treated liquor.

43. A method as defined in claim 31 wherein said acidic zinc eluting solution comprises a mineral acid.

44. A method as defined in claim 32 wherein said acidic zinc eluting solution comprises sulphuric acid.

45. A method as defined in claim 31 wherein said acidic zinc eluting solution comprises sulphuric acid, said alkaline zinc eluting solution comprises sodium cyanide, said anion exchange material is a strong base anion exchange resin and said cation exchange material is a weak acid cation exchange resin.

46. A method as defined in claim 33 wherein said acidification agent comprises a mineral acid.

47. A method as defined in claim 33 wherein said acidic zinc eluting solution comprises sulphuric acid, said acidification agent comprises sulphuric acid, said alkaline zinc eluting solution comprises sodium cyanide, said anion exchange material is a strong base anion exchange resin and said cation exchange material is a weak acid cation exchange resin.

48. A method as defined in claim 34 wherein said acidic zinc eluting solution comprises sulphuric acid, said acidification agent comprises sulphuric acid, said cyanide containing precipitate comprises CuCN, said alkaline zinc eluting solution comprises sodium cyanide, said anion exchange material is a strong base anion exchange resin and said cation exchange material is a weak acid cation exchange resin.

49. A method as defined in claim 35 wherein said acidic zinc eluting solution comprises sulphuric acid, said acidification agent comprises sulphuric acid, said cyanide containing precipitate comprises CuCN, said alkaline zinc eluting solution comprises sodium cyanide, said anion exchange material is a strong base anion exchange resin and said cation exchange material is a weak acid cation exchange resin.

50. A method as defined in claim 36 wherein said acidic zinc eluting solution comprises sulphuric acid, said acidification agent comprises sulphuric acid, said alkaline zinc eluting solution comprises sodium cyanide, said cyanide containing precipitate comprises CuCN, said soluble sulphide comprises an alkali metal sulphide, said anion exchange material is a strong base anion exchange resin and said cation exchange material is a weak acid cation exchange resin.

51. A method as defined in claim 37 wherein said acidic zinc eluting solution comprises sulphuric acid, said acidification agent comprises sulphuric acid, said alkaline zinc eluting solution comprises sodium cyanide, said cyanide containing precipitate comprises CuCN, said soluble sulphide comprises an alkali metal sulphide, said anion exchange material is a strong base anion exchange resin and said cation exchange material is a weak acid cation exchange resin.

52. A method as defined in claim 50 wherein said soluble sulphide comprises an sodium sulphide.

53. A method as defined in claim 51 wherein said soluble sulphide comprises an sodium sulphide.

54. A method as defined in claim 38 wherein said acidification agent comprises a mineral acid.

55. A method as defined in claim 38 wherein said acidic zinc eluting solution comprises sulphuric acid, said acidification agent comprises sulphuric acid, said alkaline zinc eluting solution comprises sodium cyanide, said anion exchange material is a strong base anion exchange resin and said cation exchange material is a weak acid cation exchange resin.

56. A method as defined in claim 39 wherein said acidic zinc eluting solution comprises sulphuric acid, said acidification agent comprises sulphuric acid, said cyanide containing precipitate comprises CuCN, said alkaline zinc eluting solution comprises sodium cyanide, said anion exchange material is a strong base anion exchange resin and said cation exchange material is a weak acid cation exchange resin.

57. A method as defined in claim 40 wherein said acidic zinc eluting solution comprises sulphuric acid, said acidification agent comprises sulphuric acid, said cyanide containing precipitate comprises CuCN, said alkaline zinc eluting solution comprises sodium cyanide, said anion exchange material is a strong base anion exchange resin and said cation exchange material is a weak acid cation exchange resin.

58. A method as defined in claim 41 wherein said acidic zinc eluting solution comprises sulphuric acid, said acidification agent comprises sulphuric acid, said alkaline zinc eluting solution comprises sodium cyanide, said cyanide containing precipitate comprises CuCN, said soluble sulphide comprises an alkali metal sulphide, said anion exchange material is a strong base anion exchange resin and said cation exchange material is a weak acid cation exchange resin.

59. A method as defined in claim 42 wherein said acidic zinc eluting solution comprises sulphuric acid, said acidification agent comprises sulphuric acid, said alkaline zinc eluting solution comprises sodium cyanide, said cyanide containing precipitate comprises CuCN, said soluble sulphide comprises an alkali metal sulphide, said anion exchange material is a strong base anion exchange resin and said cation exchange material is a weak acid cation exchange resin.

60. A method as defined in claim 58 wherein said soluble sulphide comprises an sodium sulphide.

61. A method as defined in claim 59 wherein said soluble sulphide comprises an sodium sulphide.

62. A method for recovering copper values and cyanide values from an anion exchange material, said anion exchange material being loaded with initial copper and precious metal values, said method comprising i) providing a first amount of an anion exchange material loaded with adsorbed complex copper cyanide anions and adsorbed complex precious metal cyanide anions and a second amount of an anion exchange material loaded with adsorbed complex copper cyanide anions and adsorbed complex precious metal cyanide anions, ii) subjecting said first amount to a copper stripping treatment step for removing copper values therefrom, said copper stripping treatment step comprising contacting said first amount with an alkaline zinc eluting solution comprising zinc complex cyanide ions so as to obtain an alkaline first eluate comprising complex copper cyanide anions and a treated first amount of anion exchange material loaded with complex zinc cyanide anions and precious metal values, iii) commingling said treated first amount and said second amount to provide a commingled anion exchange material, iv) subjecting the commingled anion exchange material to an acid zinc stripping treatment step for removing zinc values therefrom, said acid zinc treatment step comprising contacting the commingled anion exchange material with an acidic zinc eluting solution so as to obtain an acidic product eluate and an acid treated exchange material, said acidic product eluate comprising zinc cations and hydrocyanic acid, said acid treated anion exchange material comprising precious metal values and being impregnated with CuCN, v) subjecting so obtained acidic product eluate to a zinc removal step for removing zinc cations therefrom, said zinc removal step comprising contacting the commingled acidic mixed solution with a cation exchange material to remove zinc cations therefrom so as to obtain a cation exchange material loaded with adsorbed zinc cations and an acidic product liquor comprising soluble copper values and hydrocyanic acid, vi) subjecting so obtained cation exchange material loaded with adsorbed zinc cations to an alkaline zinc stripping treatment step for removing zinc values therefrom, said alkaline zinc stripping treatment step comprising contacting said cation exchange material loaded with adsorbed zinc cations, with an alkaline zinc eluting solution comprising an alkali metal cyanide so as to obtain a zinc containing product solution and a treated cation exchange material, said alkaline zinc containing product solution comprising complex zinc cyanide anions, vii) recycling complex zinc cyanide anions of said alkaline zinc containing product solution to said copper stripping treatment step, and viii) recycling so obtained treated cation exchange material to said zinc recovery step.

63. A method as defined in claim 62 wherein said alkaline first eluate comprises complex copper cyanide anions and complex zinc cyanide anions, and characterized in that an acidification agent is admixed with a said so obtained alkaline first eluate so as to obtain a first mixture comprising an acidic first solution and a cyanide containing precipitate, said acidic first solution comprising zinc cations and hydrocyanic acid, said cyanide containing precipitate comprising copper values and cyanide values, a so obtained first mixture is commingled with acidic product eluate to obtain a commingled acidic mixture comprising an acidic mixed solution and cyanide containing precipitate, and a so obtained acidic mixed solution is subjected to said zinc recovery step so as to obtain a cation exchange material loaded with zinc cations and said acidic product liquor.

64. A method as defined in claim 63 wherein a so obtained acidic mixed solution, before being subjected to a said zinc removal step, is subjected to a precipitate recovery step for separating cyanide containing precipitate therefrom.

65. A method as defined in claim 64 wherein a commingled acid mixture comprising said acidic mixed solution and said cyanide containing precipitate is passed to a said zinc removal step, said mixture being contacted with the cation exchange material so as to obtain a product mixture comprising said acidic product liquor and said cyanide containing precipitate.

66. A method as defined in claim 64 wherein cyanide containing precipitate obtained from said precipitate recovery step is subjected to a copper precipitation treatment so as to obtain a treated mixture, said treated mixture comprising a copper containing precipitate and a treated liquor, said copper containing precipitate comprising cuprous sulphide, said treated liquor comprising soluble cyanide values and wherein said treated mixture is subjected to a precipitate separation step for recovering treated liquor from said treated mixture, said copper precipitation treatment comprising contacting an aqueous mixture having a pH of from about 4 to about 6 with a soluble sulphide so as to obtain said copper containing precipitate and said treated liquor, said aqueous mixture comprising water and recovered cyanide precipitate.

67. A method as defined in claim 65 wherein a product mixture as obtained from said zinc removal step is subjected to a copper precipitation treatment so as to obtain a treated mixture, said treated mixture comprising a copper containing precipitate, said copper containing precipitate comprising cuprous sulphide, said treated liquor comprising soluble cyanide values and wherein said treated mixture is subjected to a precipitate separation step for recovering treated liquor from said treated mixture, said copper precipitation treatment comprising contacting an aqueous mixture having a pH of from about 4 to about 6 with a soluble sulphide so as to obtain said copper containing precipitate and said treated liquor.

68. A method as defined in claim 62 wherein said acidic zinc eluting solution comprises a mineral acid.

69. A method as defined in claim 62 wherein said acidic zinc eluting solution comprises sulphuric acid.

70. A method as defined in claim 62 wherein said acidic zinc eluting solution comprises sulphuric acid, said alkaline zinc eluting solution comprises sodium cyanide, said anion exchange material is a strong base anion exchange resin and said cation exchange material is a weak acid cation exchange resin.

71. A method as defined in claim 63 wherein said acidification agent comprises a mineral acid.

72. A method as defined in claim 63 wherein said acidic zinc eluting solution comprises sulphuric acid, said acidification agent comprises sulphuric acid, said alkaline zinc eluting solution comprises sodium cyanide, said anion exchange material is a strong base anion exchange resin and said cation exchange material is a weak acid cation exchange resin.

73. A method as defined in claim 64 wherein said acidic zinc eluting solution comprises sulphuric acid, said acidification agent comprises sulphuric acid, said cyanide containing precipitate comprises CuCN, said alkaline zinc eluting solution comprises sodium cyanide, said anion exchange material is a strong base anion exchange resin and said cation exchange material is a weak acid cation exchange resin.

74. A method as defined in claim 65 wherein said acidic zinc eluting solution comprises sulphuric acid, said acidification agent comprises sulphuric acid, said cyanide containing precipitate comprises CuCN, said alkaline zinc eluting solution comprises sodium cyanide, said anion exchange material is a strong base anion exchange resin and said cation exchange material is a weak acid cation exchange resin.

75. A method as defined in claim 66 wherein said acidic zinc eluting solution comprises sulphuric acid, said acidification agent comprises sulphuric acid, said alkaline zinc eluting solution comprises sodium cyanide, said cyanide containing precipitate comprises CuCN, said soluble sulphide comprises an alkali metal sulphide, said anion exchange material is a strong base anion exchange resin and said cation exchange material is a weak acid cation exchange resin.

76. A method as defined in claim 67 wherein said acidic zinc eluting solution comprises sulphuric acid, said acidification agent comprises sulphuric acid, said alkaline zinc eluting solution comprises sodium cyanide, said cyanide containing precipitate comprises CuCN, said soluble sulphide comprises an alkali metal sulphide, said anion exchange material is a strong base anion exchange resin and said cation exchange material is a weak acid cation exchange resin.

77. A method as defined in claim 75 wherein said soluble sulphide comprises an sodium sulphide.

78. A method as defined in claim 76 wherein said soluble sulphide comprises an sodium sulphide.

79. A method for removing zinc cations from an acidic solution comprising zinc cations and hydrocyanic acid and obtaining complex zinc cyanide anions, characterized in that i) the acidic solution is subjected to a zinc removal step for removing zinc cations therefrom, said zinc removal step comprising contacting the acidic solution with a cation exchange material so as to obtain an acidic product liquor comprising hydrocyanic acid and a cation exchange material loaded with adsorbed zinc cations, and ii) the cation exchange material loaded with adsorbed zinc cations is subjected to an alkaline zinc stripping treatment step for the removal of zinc values therefrom, said zinc stripping treatment step comprising contacting said cation exchange material loaded with adsorbed zinc cations, with an alkaline zinc eluting solution comprising an alkali metal cyanide so as to obtain an alkaline zinc containing product solution and a treated cation exchange material, said alkaline zinc containing product solution comprising complex zinc cyanide anions.

80. A method as defined in claim 79 wherein said treated cation exchange material is recycled to said zinc removal step for use as said cation exchange resin.

81. A method as defined in claim 79 wherein prior to said zinc removal step, said acidic solution is associated with cyanide containing precipitate, said cyanide containing precipitate comprising copper values and cyanide values.

82. A method as defined in claim 81 wherein said acidic solution, before being subjected to said zinc removal step, is subjected to a precipitate recovery step for separating cyanide containing precipitate therefrom.

83. A method as defined in claim 82 wherein cyanide containing precipitate obtained from said precipitate recovery step is subjected to a copper precipitate conversion treatment so as to obtain a treated mixture, said treated mixture comprising a copper containing precipitate and a treated liquor, said copper containing precipitate comprising cuprous sulphide, said treated liquor comprising soluble cyanide values and wherein said treated mixture is subjected to a precipitate separation step for recovering treated liquor from said treated mixture, said copper precipitate conversion treatment comprising contacting an aqueous mixture having a pH of from about 4 to about 6 with a soluble sulphide so as to obtain said copper containing precipitate and said treated liquor, said aqueous mixture comprising water and recovered cyanide containing precipitate.

84. A method as defined in claim 81 wherein a mixture of said acidic solution and cyanide containing precipitate, is subjected to said zinc removal step, said mixture being contacted with the cation exchange material so as to obtain a product mixture comprising said acidic product liquor and said cyanide containing precipitate.

85. A method as defined in claim 84 wherein a product mixture as obtained from said zinc removal step is subjected to a copper precipitate conversion treatment so as to obtain a treated mixture, said treated mixture comprising a copper containing precipitate, said copper containing precipitate comprising cuprous sulphide, said treated liquor comprising soluble cyanide values and wherein said treated mixture is subjected to a precipitate separation step for recovering treated liquor from said treated mixture, said copper precipitate conversion treatment comprising adjusting the ph of the product mixture so as to obtain a pH adjusted mixture having a pH of from about 4 to about 6 and contacting the pH adjusted mixture with a soluble sulphide so as to obtain said copper containing precipitate and said treated liquor.

86. A method as defined in claim 83 wherein said cyanide containing precipitate comprises a precipitate of CuCN, said zinc cation loaded cation exchange material is contacted with an alkaline zinc eluting solution comprising sodium cyanide, and said cation exchange material is a weak acid cation exchange resin.

87. A method as defined in claim 85 wherein said product mixture comprises a precipitate of CuCN, said zinc cation loaded cation exchange material is contacted with an alkaline zinc eluting solution comprising sodium cyanide, and said cation exchange material is a weak acid cation exchange resin.

88. A method as defined in claim 79 wherein said zinc removal step comprises contacting the acidic solution with a weak acid cation exchange material.

89. A method as defined in claim 80 wherein said zinc removal step comprises contacting the acidic solution with a weak acid cation exchange material.

90. A method as defined in claim 79 wherein said alkali metal cyanide comprises sodium cyanide.

91. A method as defined in claim 1 wherein said anion exchange material comprises a strong base anion exchange material and said cation exchange material comprises a weak acid cation exchange material.

92. A method as defined in claim 16 wherein said anion exchange material comprises a strong base anion exchange material and said cation exchange material comprises a weak acid cation exchange material.

93. A method as defined in claim 31 wherein said anion exchange material comprises a strong base anion exchange material and said cation exchange material comprises a weak acid cation exchange material.

94. A method as defined in claim 62 wherein said anion exchange material comprises a strong base anion exchange material and said cation exchange material comprises a weak acid cation exchange material.

95. A method as defined in claim 1 wherein the copper stripping treatment step comprises contacting said anion exchange material with an alkaline copper eluting solution comprising zinc complex cyanide ions so as to obtain a treated zinc loaded anion exchange material loaded with substantially all of the initial precious metal values.

96. A method as defined in claim 16 wherein the zinc stripping treatment step comprises contacting said anion exchange material with an acid zinc eluting solution so as to obtain an acid treated anion exchange material loaded with substantially all of the initial precious metal values.

97. A method as defined in claim 31 wherein the copper stripping treatment step comprises contacting said anion exchange material with an alkaline copper eluting solution comprising zinc complex cyanide ions so as to obtain a treated zinc loaded anion exchange material loaded with substantially all of the initial precious metal values and wherein the zinc stripping treatment step comprises contacting said anion exchange material with an acid zinc eluting solution so as to obtain an acid treated anion exchange material loaded with substantially all of precious metal values loaded on said alkaline treated zinc loaded anion exchange material.

98. A method as defined in claim 62 wherein the copper stripping treatment step comprises contacting said anion exchange material with an alkaline copper eluting solution comprising zinc complex cyanide ions so as to obtain a treated zinc loaded anion exchange material loaded with substantially all of the initial precious metal values and wherein the zinc stripping treatment step comprises contacting said anion exchange material with an acid zinc eluting solution so as to obtain an acid treated anion exchange material loaded with substantially all of precious metal values loaded on said alkaline treated zinc loaded anion exchange material.

* * * * *

UNITED STATES PATENT AND TRADEMARK OFFICE
CERTIFICATE OF CORRECTION

PATENT NO. : 5,605,563
DATED : February 25, 1997
INVENTOR(S) : Denis K. Kidby et al It is certified that error appears in the above-indentified patent and that said Letters Patent is hereby corrected as shown below:

column 36, line 38 (claim 80), "resin" should be changed to -- material --.

Signed and Sealed this

Seventeenth Day of June, 1997

Attest:

BRUCE LEHMAN

Attesting Officer

Commissioner of Patents and Trademarks